(12) United States Patent
Shinotsuka et al.

(10) Patent No.: US 10,585,638 B2
(45) Date of Patent: Mar. 10, 2020

(54) TERMINAL APPARATUS, OUTPUT APPARATUS, AND INFORMATION PROCESSING SYSTEM

(71) Applicants: Michiaki Shinotsuka, Kanagawa (JP); Tsutomu Kawase, Kanagawa (JP)

(72) Inventors: Michiaki Shinotsuka, Kanagawa (JP); Tsutomu Kawase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/145,404

(22) Filed: Sep. 28, 2018

(65) Prior Publication Data
US 2019/0129686 A1 May 2, 2019

(30) Foreign Application Priority Data

Oct. 27, 2017 (JP) ................... 2017-208674

(51) Int. Cl.
*G06F 3/16* (2006.01)
*H04R 1/34* (2006.01)
(Continued)

(52) U.S. Cl.
CPC .............. *G06F 3/165* (2013.01); *H04R 1/345* (2013.01); *H04W 4/021* (2013.01); *H04W 4/023* (2013.01);
(Continued)

(58) Field of Classification Search
CPC ......... G06F 3/165; H04R 1/025; H04R 1/288; H04R 29/001; H04W 4/021; H04W 4/023; H04W 4/026
See application file for complete search history.

(56) References Cited

U.S. PATENT DOCUMENTS 9,955,259 B2    4/2018  Shinotsuka et al.
2002/0067841 A1*  6/2002  Bank ...................... H04R 7/045
                                                    381/152
(Continued)

FOREIGN PATENT DOCUMENTS

JP    2001-112097    4/2001

OTHER PUBLICATIONS

Thrun et al. "Probabilistic Algorithms and the Interactive Museum Tour-Guide Robot Minerva", 35 pages. (Year: 2000).*

*Primary Examiner* — Ping Lee
(74) *Attorney, Agent, or Firm* — IPUSA, PLLC

(57) ABSTRACT

A terminal apparatus for providing description about one or more objects arranged in a predetermined area is provided. The terminal apparatus includes a memory configured to store arrangement information indicating arrangement of the one or more objects in the predetermined area and description information associated with the one or more objects; and a processor coupled to the memory and configured to obtain area identification information for identifying the predetermined area when the terminal apparatus is located in the predetermined area, identify a positional relationship between the terminal apparatus and the one or more objects based on the arrangement information when the area identification information is obtained, and cause the terminal apparatus to describe an object of the one or more objects, in accordance with the identified positional relationship between the terminal apparatus and the one or more objects.

12 Claims, 29 Drawing Sheets

(51) Int. Cl.
*H04R 7/10* (2006.01)
*H04R 9/02* (2006.01)
*H04R 9/04* (2006.01)
*H04R 1/02* (2006.01)
*H04R 1/28* (2006.01)
*H04R 29/00* (2006.01)
*H04W 4/02* (2018.01)
*H04W 4/021* (2018.01)

(52) U.S. Cl.
CPC ............ *H04W 4/026* (2013.01); *H04R 1/025* (2013.01); *H04R 1/288* (2013.01); *H04R 7/10* (2013.01); *H04R 9/025* (2013.01); *H04R 9/047* (2013.01); *H04R 29/001* (2013.01)

(56) References Cited

U.S. PATENT DOCUMENTS

2014/0237076 A1* 8/2014 Goldman ............ G06F 16/9537
709/217
2015/0094851 A1* 4/2015 Kawabe ............... B25J 11/0005
700/246
2017/0300474 A1* 10/2017 Devkar ................. G10L 13/043
2018/0349700 A1* 12/2018 Percuoco ............... G06Q 10/00

* cited by examiner

FIG.5A

| AREA ID | ARRANGEMENT INFORMATION ||| DESCRIPTION INFORMATION | ADDITIONAL INFORMATION 412 | |
|---|---|---|---|---|---|---|
| | ARRANGEMENT POSITION | EXHIBIT | EXHIBIT ID | | | |
| AREA001 | NORTH | EXHIBIT 103a | ITEM001 | THIS IS AA BY XX. | EVENT X IS CURRENTLY HELD AT YY | ... |
| | WEST | EXHIBIT 103b | ITEM002 | THIS IS BB BY YY | THIS IS AN OLD MODEL OF XX. | ... |
| | SOUTH | EXHIBIT 103c | ITEM003 | ... | ... | ... |
| | EAST | EXHIBIT 103d | ITEM004 | ... | ... | ... |
| | NORTHWEST | EXHIBIT 103e | ITEM005 | ... | ... | ... |
| AREA002 | SOUTHWEST | EXHIBIT 103f | ITEM006 | ... | ... | ... |
| | EAST | EXHIBIT 103g | ITEM007 | ... | ... | ... |
| ... | ... | ... | ... | ... | ... | ... |

FIG.5B

| USER ID | AREA ID RECEPTION HISTORY | EXHIBIT DESCRIPTION HISTORY 413 |
|---------|---------------------------|---------------------------------|
| USER001 | AREA001<br>AREA002 | ITEM001, ITEM002, ITEM003<br>ITEM005, ITEM006, ITEM007 |
| USER002 | AREA001 | ITEM002, ITEM003 |
| ... | ... | ... |

FIG.5C

| AREA ID | ARRANGEMENT INFORMATION | | | DESCRIPTION INFORMATION | ADDITIONAL INFORMATION 412 | ... |
|---|---|---|---|---|---|---|
| | ARRANGEMENT POSITION | EXHIBIT | EXHIBIT ID | | | |
| AREA001 | NORTH | EXHIBIT 103a | ITEM001 | THIS IS AA BY XX. | EVENT X IS CURRENTLY HELD AT YY. | ... |
| | WEST | EXHIBIT 103h | ITEM008 | THIS IS BB BY ZZ. | THIS IS SUCCESSOR MODEL TO XX. | ... |
| | SOUTH | EXHIBIT 103c | ITEM003 | ... | | ... |
| | EAST | EXHIBIT 103d | ITEM004 | ... | | ... |
| AREA002 | NORTHWEST | EXHIBIT 103e | ITEM005 | ... | | ... |
| | SOUTHWEST | EXHIBIT 103f | ITEM006 | ... | | ... |
| | EAST | EXHIBIT 103g | ITEM007 | ... | | ... |
| ... | ... | ... | ... | ... | ... | ... |

FIG.13A

| AREA ID | ARRANGEMENT INFORMATION | | DESCRIPTION INFORMATION | ACTION |
|---|---|---|---|---|
| | ARRANGEMENT POSITION | EXHIBIT | EXHIBIT ID | | |
| AREA001 | NORTH | EXHIBIT 103a | ITEM001 | THIS IS A PORTRAIT OF AA. | – |
| | WEST | EXHIBIT 103b | ITEM002 | THIS IS A FLOWER ARRANGEMENT BY YY | – |
| | EAST | EXHIBIT 1001 | ITEM101 | LOOK! THERE IS A DINOSAUR. | ROARING, CAUSING EYES TO GLOW, WAGGING TAIL |
| AREA002 | NORTH | EXHIBIT 1002 | ITEM005 | THAT IS A MODEL RAILWAY OF AA LINE. | WHISTLING |
| ... | ... | ... | ... | ... | ... |

| USER ID | AREA ID RECEPTION HISTORY | EXHIBIT DESCRIPTION HISTORY | TERMINAL ID TRANSMISSION HISTORY | ACTION ID RECEPTION HISTORY |
|---|---|---|---|---|
| USER001 | AREA001 AREA002 | ITEM001, ITEM002, ITEM003 ITEM005, ITEM006, ITEM007 | AREA001 | ACT001 |
| USER002 | — | — | — | — |
| ⋮ | ⋮ | ⋮ | ⋮ | ⋮ |

| ACTION ID | ACTION |
|---|---|
| ACT001 | WAVING HAND |
| ACT002 | SCREAMING |
| ACT003 | UTTERANCE "HELLO" |
| ... | ... |

| IDENTIFICATION INFORMATION | ACTION |
|---|---|
| ACT001 | CAUSING EYES TO GLOW |
| ACT002 | ROARING (LOUDLY) |
| ACT003 | WAGGING TAIL |
| ... | ... |
| TERMINAL ID | ROARING, CAUSING EYES TO GLOW, WAGGING TAIL |
| ... | ... |

| ACTION ID | ACTION |
|---|---|
| ACT001 | EVENT 1 |
| ACT002 | EVENT 2 |
| ACT003 | EVENT 3 |
| ... | ... |

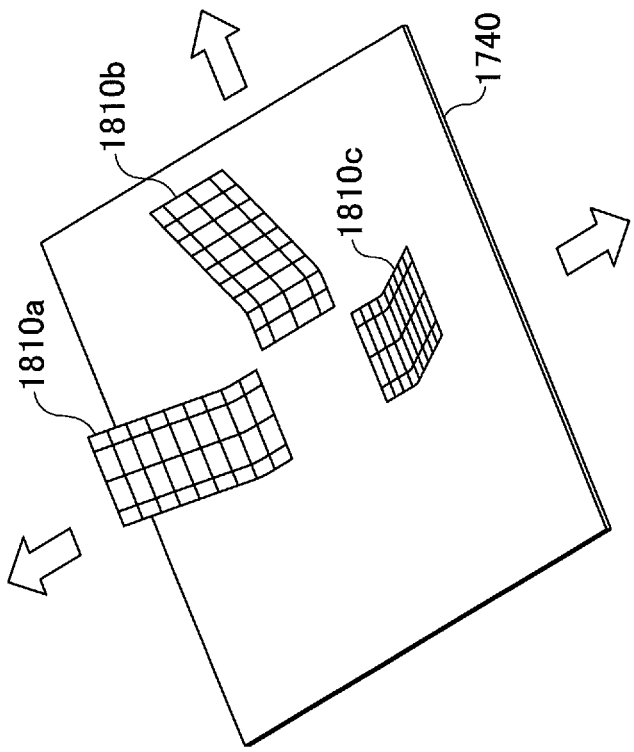
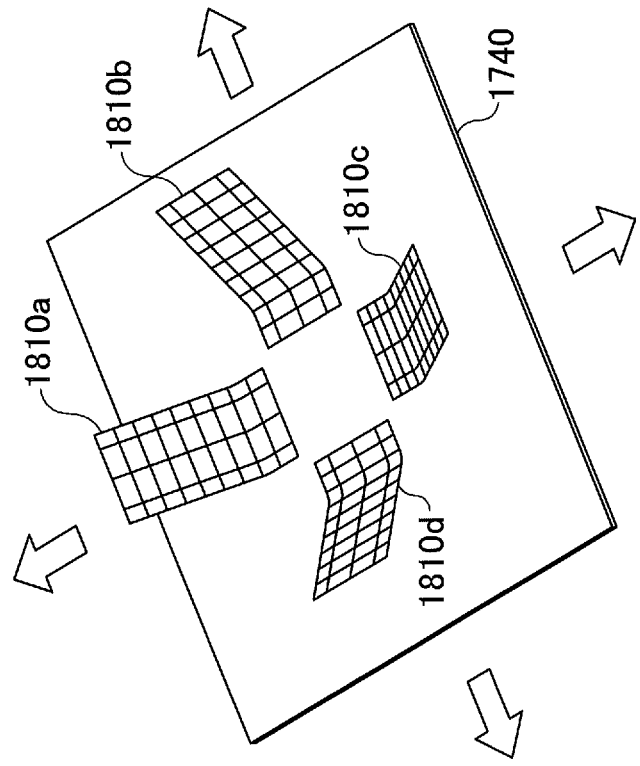

TERMINAL APPARATUS, OUTPUT APPARATUS, AND INFORMATION PROCESSING SYSTEM

CROSS-REFERENCE TO RELATED APPLICATION

The present application claims priority under 35 U.S.C. § 119 to Japanese Patent Application No. 2017-208674, filed on Oct. 27, 2017, the entire contents of which are incorporated herein by reference.

BACKGROUND OF THE INVENTION

1. Field of the Invention

The disclosures herein generally relate to a terminal apparatus, an output apparatus, and an information processing system.

2. Description of the Related Art

In various facilities such as art galleries, museums, and exhibition halls, audio guides may sometimes be used to provide descriptions about exhibits.

As such an audio guide, an audio guide system is known that includes a plurality of transmitting apparatuses configured to transmit ID code signals, and also includes a playback apparatus configured to receive the ID code signals transmitted from the transmitting apparatuses, read guide audio stored in association with the ID code signals, and play the guide audio back (see Patent Document 1, for example).

In the audio guide system disclosed in Patent Document 1, when a user who uses the playback apparatus comes in front of an exhibit, guide audio about the exhibit is played back. In such a conventional audio guide system, when a plurality of exhibits (objects) are arranged in a predetermined area where ID code signals are transmitted, it is difficult to provide descriptions in accordance with the user's interest or intention.

RELATED-ART DOCUMENTS

Patent Document

[Patent Document 1] Japanese Unexamined Patent Application Publication No. 2001-112097

SUMMARY OF THE INVENTION

According to one embodiment, a terminal apparatus for providing a description about one or more objects arranged in a predetermined area is provided. The terminal apparatus includes a memory configured to store arrangement information indicating arrangement of the one or more objects in the predetermined area and description information associated with the one or more objects; and a processor coupled to the memory and configured to obtain area identification information for identifying the predetermined area when the terminal apparatus is located the predetermined area, identify a positional relationship between the terminal apparatus and the one or more objects based on the arrangement information when the area identification information is obtained, and cause the terminal apparatus to describe an object of the one or more objects, in accordance with the identified positional relationship between the terminal apparatus and the one or more objects.

BRIEF DESCRIPTION OF THE DRAWINGS

FIGS. 5A through 5C are tables illustrating examples of information managed by the terminal apparatus according to the first embodiment;

FIGS. 13A through 13E are tables illustrating examples of information managed by the information processing system according to the second embodiment;

FIGS. 23A and 23B are drawings for explaining the output apparatus according to the third embodiment.

DESCRIPTION OF THE PREFERRED EMBODIMENTS

In the following, embodiments of the present invention will be described with reference to the accompanying drawings.

According to one embodiment, in a terminal apparatus for providing a description about one or more objects (such as exhibits) arranged in a predetermined area, it becomes possible to describe the objects in accordance with a user's interest or intention.

<System Configuration>

Figure 1:
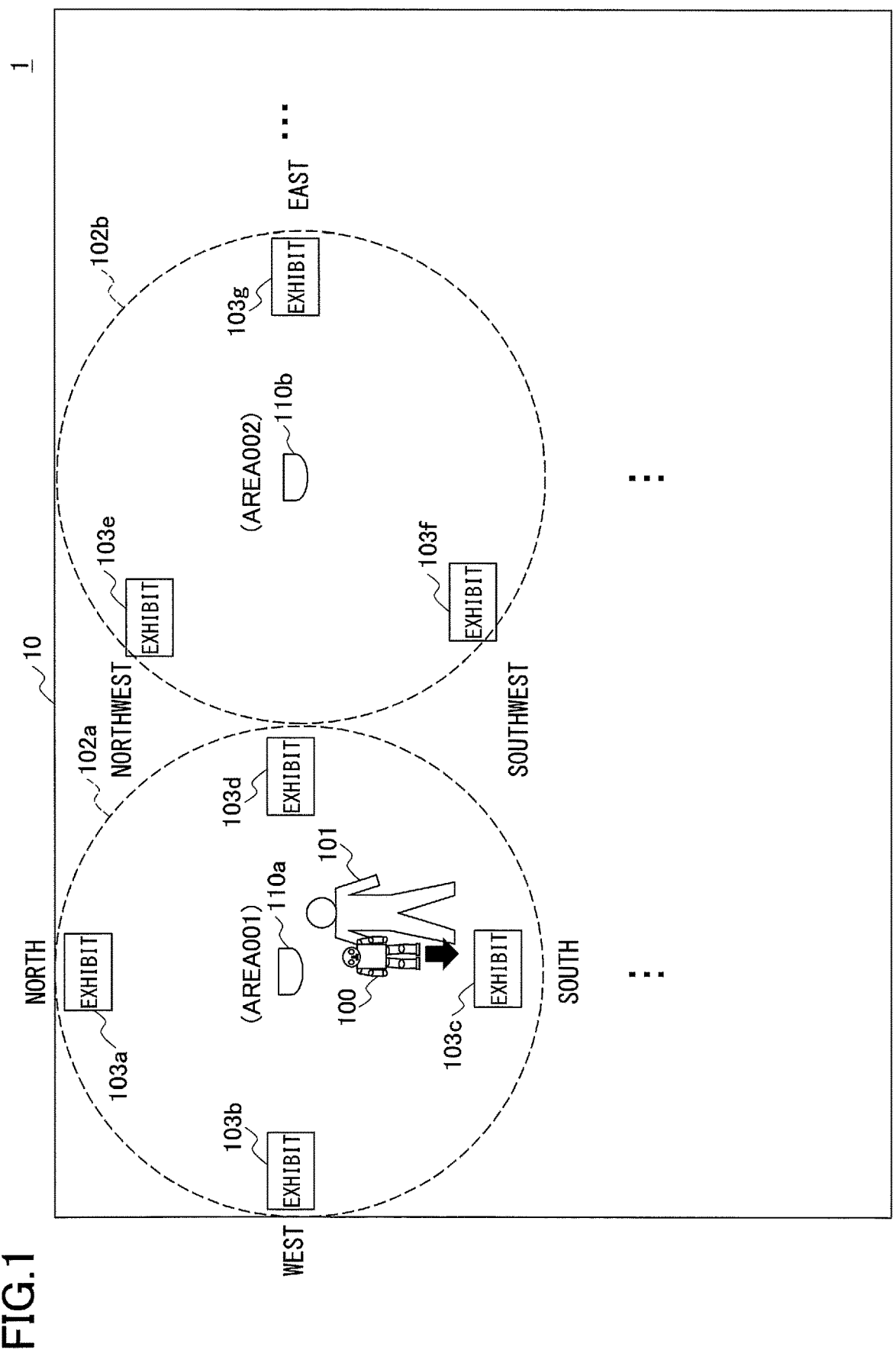
FIG. 1 is a diagram illustrating a system configuration of an information processing system according to one embodiment.

FIG. 1 is a diagram illustrating a system configuration of an information processing system according to one embodiment. An information processing system 1 is a system configured to provide a user 101 of a facility 10, such as an art gallery, a museum, and an exhibition hall, with descriptions of a plurality of exhibits 103a through 103g exhibited in the facility 10.

In the example of FIG. 1, the information processing system 1 includes a plurality of output apparatuses 110a and 110b, the plurality of exhibits 103a through 103g, and a terminal apparatus 100 possessed by the user 101.

In the following description, in order to refer to any of the plurality of output apparatuses 110a and 110b, an "output apparatus 110" is used. Also, in order to refer to any of the plurality of exhibits 103a through 103g, an "exhibit 103" is used. The number of output apparatuses 110 and the number of exhibits 103 illustrated in FIG. 1 are merely exemplary.

The output apparatus 110 is an apparatus configured to output, in a predetermined area, a signal (such as a sound wave, a radio wave, and light) that includes area identification information (hereinafter referred to as an "area ID") for identifying the predetermined area. For example, in FIG. 1, the output apparatus 110a outputs, in an area 102a, a signal including an area ID "AREA001". The output apparatus 110b outputs, in an area 102b, a signal including an area ID "AREA002".

Preferably, the output apparatus 110 outputs a sound wave including an area ID with a frequency of greater than or equal to 16 kHz, within a frequency range (for example, 20 Hz to 20 kHz) that can be picked up by a microphone included in the terminal apparatus 100.

A sound wave with a frequency of greater than or equal to 16 kHz has high directivity and is difficult to be heard by humans. Thus, in order to output a sound wave including an area ID in a predetermined area, the frequency of greater than or equal to 16 kHz is preferable. In particular, a sound wave with a frequency of 16 kHz to 20 kHz can be picked up by a commonly available microphone. Thus, in order to output a sound wave including an area ID to the terminal apparatus 100, the frequency of 16 kHz to 20 kHz is preferable. In the following description, it is assumed that the output apparatus 110 outputs a sound wave including an area ID; however, the present invention is not limited thereto. The output apparatus 110 may output a signal including an area ID via near-field communication or light.

The terminal apparatus 100 is an information terminal (such as a robot information terminal, a smartphone, a tablet terminal, or a wearable terminal) possessed by the user 101.

For example, the terminal apparatus 100 is preferably a robot terminal that is lent in the facility 10 such as an art gallery, a museum, or an exhibition hall. In the following description, it is assumed that the terminal apparatus is a robot information terminal that is lent in the facility 10; however, the present invention is not limited thereto. The terminal apparatus 100 may be an information terminal having a shape resembling a human, an animal, a game character, or an animation character. Alternatively, the terminal apparatus 100 may be a commonly available information terminal such as smartphone.

The terminal apparatus 100 has a standard computer configuration. The terminal apparatus 100 includes a memory configured to store arrangement information indicating arrangement of exhibits (objects) in each area and description information (such as audio data) associated with the exhibits.

Further, the terminal apparatus 100 includes a microphone that picks up sound waves output from the output apparatus 110. For example, in the area 102a, the terminal apparatus 100 can obtain an area ID included in a sound wave output from the output apparatus 110a.

Further, the terminal apparatus 100 includes sensors such as an orientation sensor and geomagnetic field sensor, so as to detect a direction of the terminal apparatus 100 (for example, a direction to which the face of the robot information terminal is directed).

With the above-described configuration, in FIG. 1, for example, when the user 101 possessing the terminal apparatus 100, which is the robot information terminal, enters the area 102a, the terminal apparatus 100 obtains the area ID "AREA001". Also, when the terminal apparatus 100 obtains the area ID, the terminal apparatus 100 identifies a positional relationship between the terminal apparatus 100 and the exhibits 103a through 103d based on arrangement information stored in the memory, and describes the exhibits to the user 101 in accordance with the identified positional relationship.

For example, in FIG. 1, the terminal apparatus 100, which is the robot information terminal, and the user 101 are assumed to be facing the direction of the exhibit 103c. In this case, by using the above-described sensors, the terminal apparatus 100 detects that the terminal apparatus 100 is facing the south direction. The terminal apparatus 100 also identifies that the exhibit 103c, placed on the south side of the area 102a, is located in the direction in which the terminal apparatus 100 is facing. Further, the terminal apparatus 100 reads out description information associated with the exhibit 103c located in the direction in which the terminal apparatus 100 and the user 101 are facing, and provides a description about the exhibit 103c (for example, outputting audio that describes the exhibit 103c) to the user 101.

Similarly, when the user 101 desires to hear a description of the exhibit 103a, for example, the user 101 can hear the description of the exhibit 103a by turning the face of the terminal apparatus 100, which is the robot information terminal, towards the exhibit 103a.

As described, according to the present embodiment, in the terminal apparatus 100 for providing a description about one or more objects (such as the exhibits 103) arranged in a predetermined area, it becomes possible to describe the objects in accordance with the user 101's interest or intention.

<Hardware Configurations>

Next, hardware configurations of the terminal apparatus 100 and the output apparatus 110 will be described.

(Hardware Configuration of Terminal Apparatus)

Figure 2:
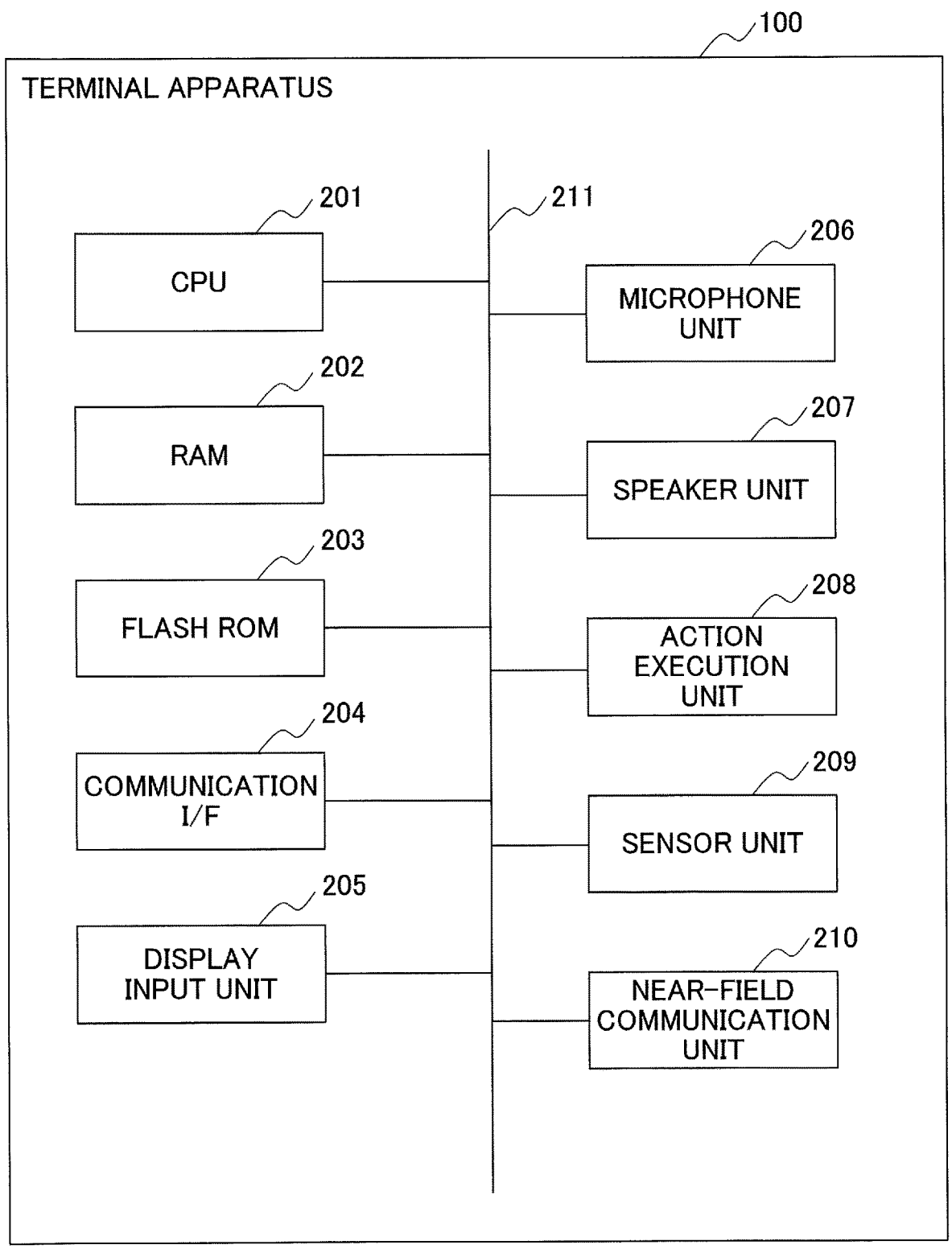
FIG. 2 is a diagram illustrating a hardware configuration of a terminal apparatus according to one embodiment.

FIG. 2 is a diagram illustrating a hardware configuration of the terminal apparatus according to one embodiment. The terminal apparatus 100 includes, for example, a CPU (central processing unit) 201, RAM (random-access memory) 202, flash ROM (read-only memory) 203, a communication interface (I/F) 204, a display input unit 205, a microphone unit 206, a speaker unit 207, an action execution unit 208, a sensor unit 209, and a bus 211. Further, the terminal apparatus 100 includes a near-field communication unit 210 in a case where the output apparatus 110 transmits a radio wave including an area ID via near-field communication, instead of (or in addition to) a sound wave including an area ID.

The CPU 201 is a processor configured to implement functions of the terminal apparatus 100 by executing programs for the terminal apparatus 100 stored in the flash ROM 203. The RAM 202 is volatile memory used as a work area of the CPU 201. The flash ROM 203 is non-volatile memory that stores various types of information such as the programs for the terminal apparatus 100 and other data.

The communication I/F 204 is a communication interface such as a wireless LAN (local area network) or Long-Term Evolution (LTE) for connecting the terminal apparatus 100 to a communication network.

The display input unit 205 includes a display unit that displays information and an input unit that receives an operation input. For example, the display input unit 205 is implemented by a touch panel display. Further, the display unit and the input unit may be separately provided.

The microphone unit 206 includes a sound collecting device such as a microphone, and converts a sound wave obtained by the sound collecting device such as the microphone into an electrical signal. The speaker unit 207 includes a speaker that converts a sound wave signal into a sound wave and outputs the sound wave, and also includes an amplifier circuit that amplifies a sound wave signal.

The action execution unit 208 causes the terminal apparatus 100 to perform a predetermined action. For example, when the terminal apparatus 100 is a robot information terminal (a smart robot), the action execution unit 208 includes an actuator (such as a motor) for causing the terminal apparatus 100 to perform actions such as moving, bowing, and waving of the hand.

The sensor unit 209 includes, for example, the orientation sensor that detects a direction in which the terminal apparatus 100 is facing, a gyro-sensor that detects an angular velocity, and an acceleration sensor that detects acceleration.

The near-field communication unit 210 includes, for example, an antenna, a wireless circuit, and a communication control unit so as to perform wireless communications in accordance with the same near-field communication method as the output apparatus 110. The bus 211 is coupled to the above-described elements, and transmits address signals, data signals, and various types of control signals.

(Hardware Configuration of Output Apparatus)

Figure 3:
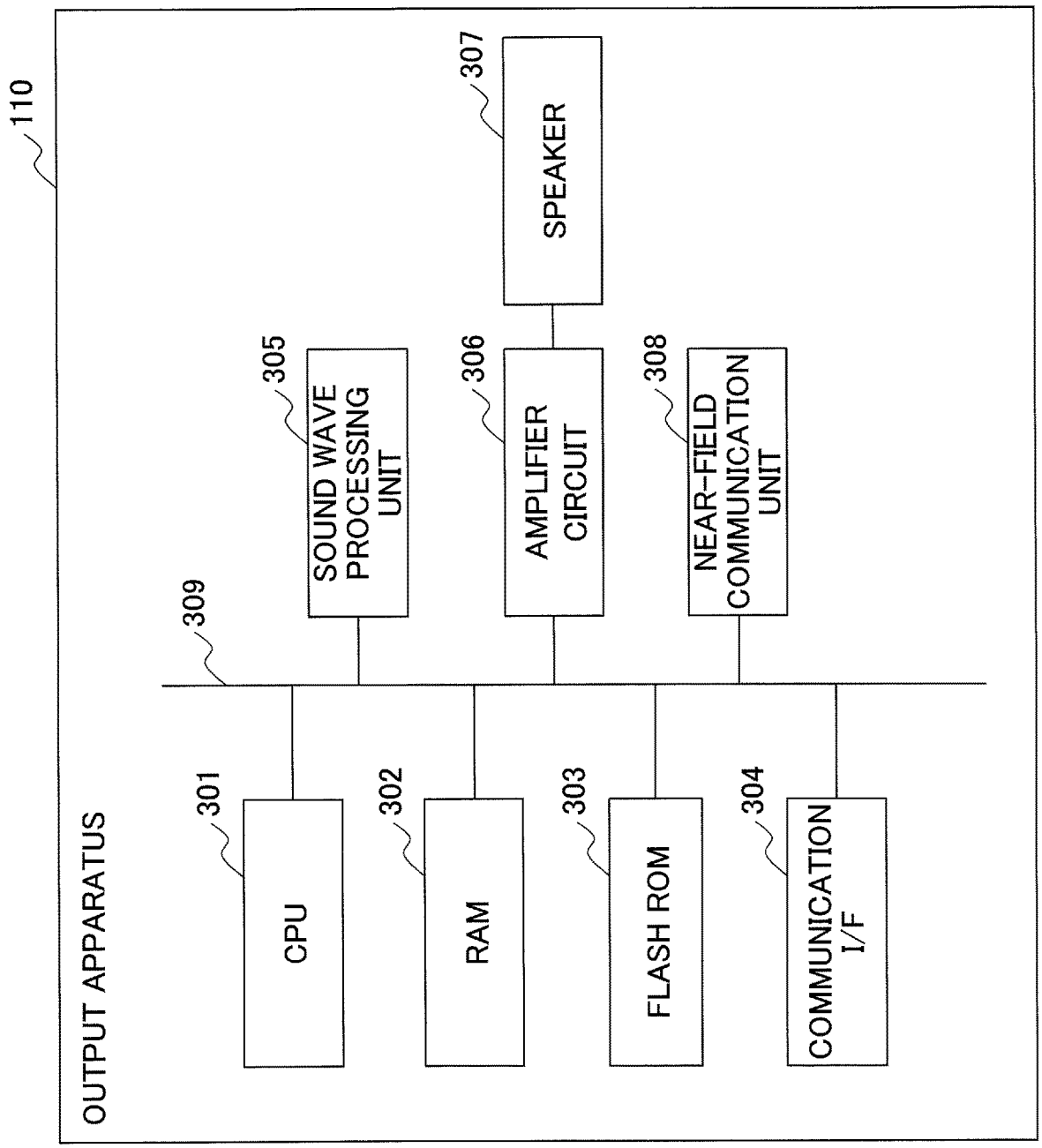
FIG. 3 is a diagram illustrating a hardware configuration of an output apparatus according to one embodiment.

FIG. 3 is a diagram illustrating a hardware configuration of the output apparatus according to one embodiment. The output apparatus 110 includes, for example, a CPU 301, a RAM 302, a flash ROM 303, a communication I/F 304, a sound wave processing unit 305, an amplifier circuit 306, a speaker 307, and a bus 309. Also, the output apparatus 110 includes a near-field communication unit 308 in a case where a radio wave including an area ID is transmitted via near-field communication.

The CPU 301 is a processor configured to implement functions of the output apparatus 110 by executing programs for the output apparatus 110 stored in the flash ROM 303. The RAM 302 is volatile memory used as a work area of the CPU 301. The flash ROM 303 is non-volatile memory that stores various types of information such as the programs for the output apparatus 110 and area IDs.

The communication I/F 304 is a communication interface such as a wireless LAN or a wired LAN for connecting the output apparatus 110 to a communication network.

The sound wave processing unit 305 performs, for example, a process for generating a sound wave including an area ID in accordance with the CPU 301's control.

Further, in the present embodiment, as a method for generating a sound wave including an area ID, information may be transmitted by modulating a sound wave with a predetermined frequency by using frequency shift keying (FSK) or phase shift keying (PSK), for example. However, the present embodiment is not limited thereto.

Alternatively, as the method for generating a sound wave including an area ID, a sound wave with a predetermined frequency (such as 19 kHz) may be turned on or off so as to indicate digital values of "1" or "0". In this case, when a sound wave is received, the information terminal 100 may obtain information included in the sound wave by determining the presence or absence of a predetermined frequency at a given sampling rate.

Further, the sound wave processing unit 305 may be implemented by, for example, an integrated circuit for audio processing, or may be implemented by a digital signal processor. Alternatively, the sound wave processing unit 305 may be implemented by programs executed by the CPU 301.

The amplifier circuit 306 is a sound wave amplifier that amplifies a sound wave signal to be output to the speaker 307. The speaker 307 is a speaker that converts a sound wave signal output from the amplifier circuit 306 into a sound wave, and outputs the converted sound wave. A configuration example of the speaker 307 will be described in a third embodiment.

The near-field communication unit 308 includes, for example, an antenna, a wireless circuit, and a communication control unit so as to perform wireless communications in accordance with the same near-field communication method as the terminal apparatus 100. The bus 309 is coupled to the above-described elements, and transmits address signals, data signals, and various types of control signals.

First Embodiment

<Functional Configuration>

Figure 4:
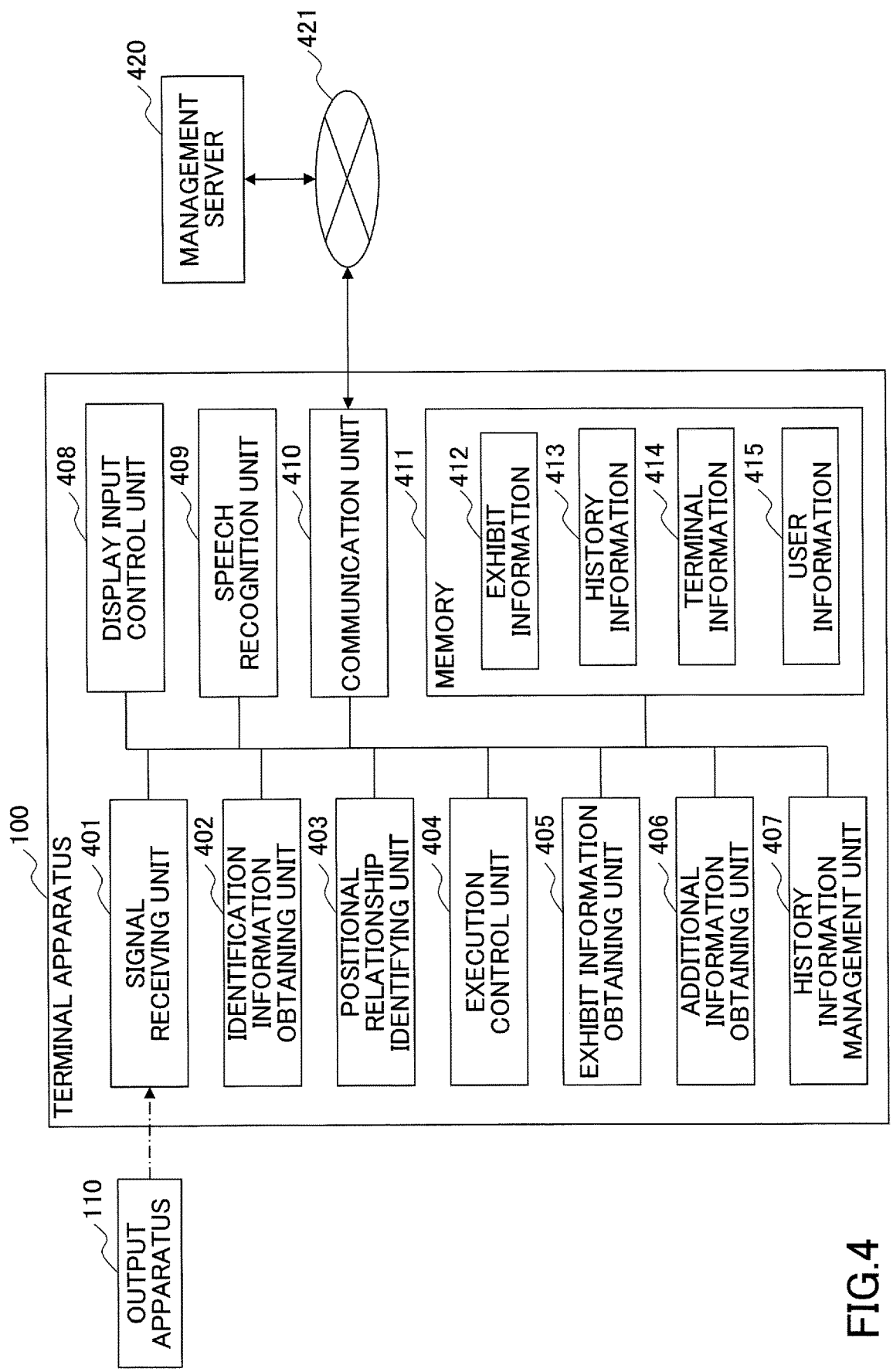
FIG. 4 is a diagram illustrating an example of a functional configuration of the terminal apparatus according to a first embodiment.

FIG. 4 is a diagram illustrating a functional configuration of the terminal apparatus according to a first embodiment. The terminal apparatus 100 includes, for example, a signal receiving unit 401, an identification information obtaining unit 402, a positional relationship identifying unit 403, an execution control unit 404, an exhibit information obtaining unit 405, an additional information obtaining unit 406, a history information management unit 407, a display input control unit 408, a speech recognition unit 409, a communication unit 410, and a memory 411.

The terminal apparatus 100 implements the above-described functional configuration by executing application programs (hereinafter referred to as applications) for the terminal apparatus 100. The applications are stored in the flash ROM 203 illustrated in FIG. 2, for example, and are compatible with the information processing system 1. At least a part of the functional configuration may be implemented by hardware.

The signal receiving unit 401 is implemented by an application that is executed by the CPU 201, for example. Also, the signal receiving unit 401 receives a signal including an area ID, output from the output apparatus 110. For example, by using the microphone unit 206 illustrated in FIG. 2, the signal receiving unit 401 receives, in the area 102a of FIG. 1, a sound wave including an area ID output from the output apparatus 110a. As another example, by using the near-field communication unit 210 illustrated in FIG. 2, the signal receiving unit 401 may receive a radio wave including an area ID output from the output apparatus 110. In the following description, it is assumed that the signal receiving unit 401 receives a sound wave including an area ID output from the output apparatus 110.

The identification information obtaining unit 402 is implemented by an application that is executed by the CPU 201, for example. Also, the identification information obtaining unit 402 obtains identification information such as an area ID from a signal received by the signal receiving unit 401. For example, the identification information obtaining unit 402 analyzes a sound wave received by the signal receiving unit 401 in the area 102a of FIG. 1, and extracts the area ID "AREA001" included in the sound wave.

The positional relationship identifying unit 403 is implemented by an application that is executed by the CPU 201, for example. When the identification information obtaining unit 402 obtains an area ID, the positional relationship identifying unit 403 identifies a positional relationship between the terminal apparatus 100 and exhibits based on arrangement information included in exhibit information 412 stored in the memory 411.

The memory 411 stores exhibit information 412 as illustrated in FIG. 5A. The exhibit information 412 may be stored in the memory 411 before the terminal apparatus 100 is lent to the user. Alternatively, the exhibit information 412 may be obtained from a management server 420 by the exhibit information obtaining unit 405, which will be described later, and may be stored in the memory 411.

In the example of FIG. 5A, the exhibit information 412 includes "area ID," "arrangement information," "description information," and "additional information".

The "area ID" is area identification information for identifying an area, such as the areas 102a and 102b as described above.

The "arrangement information" is information indicating positions where exhibits (objects) are arranged in each area. In the example of FIG. 5A, the "arrangement information" includes information such as "arrangement position," "exhibit," and "exhibit ID". The "arrangement position" is information indicating positions of exhibits in each area and represented by orientations such as the north, west, south, and east in the example of FIG. 5A. The "arrangement position" information illustrated in FIG. 5A is merely exemplary. The "arrangement position" may be represented by an azimuth, with the north direction as a reference. The "exhibit" is information indicating a name or an overview of each exhibit. The "exhibit ID" is identification information for identifying each exhibit.

In the example of FIG. 5A, the exhibit 103a having an exhibit ID "ITEM001" is placed on the north side of the area (the area 102a) having the area ID "AREA001," as illustrated in FIG. 1. Similarly, the exhibit 103b having an exhibit ID "ITEM002" is placed on the west side of the area 102a, the exhibit 103c having an exhibit ID "ITEM003" is placed on the south side, and the exhibit 103d having an exhibit ID "ITEM004" is placed on the east side.

The "description information" is a description associated with a corresponding exhibit. The description information may be audio data for describing an exhibit, and may also contain strings and image data for describing the exhibit.

When the additional information obtaining unit 406, which will be described later, obtains additional information on a corresponding exhibit, the obtained additional information is stored in the "additional information".

Referring back to FIG. 4, the functional configuration of the terminal apparatus 100 continues to be described.

When the identification information obtaining unit 402 obtains an area ID, the positional relationship identifying unit 403 obtains a direction in which the terminal apparatus 100 is facing by using the sensor unit 209, and identifies an exhibit located in a predetermined direction with respect to the terminal apparatus 100 based on the arrangement information included in the exhibit information 412.

Preferably, when the identification information obtaining unit 402 obtains an area ID, the positional relationship identifying unit 403 identifies an exhibit located in a direction to which the face of the terminal apparatus 100, which is the robot information terminal, is turned. For example, in FIG. 1, when the face of the terminal apparatus 100 is directed to the south direction, the positional relationship identifying unit 403 identifies the exhibit 103c located on the south side of the area 102a based on the arrangement information included in the exhibit information 412.

Further, in FIG. 1, when the user 101 causes the face of the terminal apparatus to turn to the direction of the exhibit 103a, the positional relationship identifying unit 403 identifies the exhibit 103a located on the north side of the area 102a based on the arrangement information included in the exhibit information 412.

The execution control unit 404 is implemented by an application executed by the CPU 201, for example. Also, the execution control unit 404 causes the terminal apparatus 100 to describe an exhibit in accordance with the positional relationship between the terminal apparatus 100 and the exhibit identified by the positional relationship identifying unit 403.

For example, when the relationship identifying unit 403 identifies an exhibit located in a direction to which the face of the terminal apparatus 100, which is the robot information terminal, is directed, the execution control unit 404 causes the speaker unit 207 to output a description of the identified exhibit. For example, in FIG. 1, when the positional relationship identifying unit 403 identifies the exhibit 103c located on the south direction to which the face of the terminal apparatus 100 is directed, the execution control unit 404 obtains description information (audio data) associated with the exhibit 103c stored in the exhibit information 412, and causes the speaker unit 207 to output the obtained description information.

The exhibit information obtaining unit 405 is implemented by an application that is executed by the CPU 201. The exhibit information 412 stored in the memory 411 is obtained by the exhibit information obtaining unit 405 from the management server 420, for example.

Herein, the management server 420 is an information processing apparatus or a system including a plurality of information processing apparatuses capable of communicating with the terminal apparatus 100 via a communication network 421. The terminal apparatus 100 may operate as a stand-alone apparatus by using the exhibit information 412 preliminarily stored in the memory 411. However, the terminal apparatus 100 may be configured to obtain the exhibit information 412 from the management server 420 and to store the exhibit information 412 in the memory 411.

The additional information obtaining unit 406 is implemented by an application that is executed by the CPU 201, for example. Also, the additional information obtaining unit 406 obtains additional information on an exhibit from the management server 420, for example. The additional information is described by using the speaker unit 207.

For example, the additional information obtaining unit 406 obtains, from the management server 420, information such as current weather information and event information requiring real-time performance and unable to be preliminarily stored in the memory 411. Then, the additional information obtaining unit 406 stores the obtained information in the exhibit information 412 of the memory 411 as additional information. Accordingly, the execution control unit 404 can provide the user 101 with additional information such as weather information and event information, in addition to description information stored in the exhibit information 412 of the memory 411.

The history information management unit 407 is implemented by an application that is executed by the CPU 201, for example. Also, for each user 101 who uses the terminal apparatus 100, the history information management unit 407 manages history information 413 that stores information such as exhibit IDs of exhibits that have already been described and area IDs that have already been received.

For example, the history information management unit 407 stores the history information 413 in the memory 411 and manages the history information 413 as illustrated in FIG. 5B. In the example of FIG. 5B, the history information 413 includes "user ID," "area ID reception history," and "exhibit description history".

The "user ID" is identification information for identifying a user 101 who uses the terminal apparatus 100. The "area ID reception history" is a list of area IDs that have already been received by the terminal apparatus 100. The area IDs are managed in association with each user ID. Accordingly, the terminal apparatus 100 can manage areas visited by each user 101 who uses the terminal apparatus 100.

The "exhibit description history" is a list of exhibits that have been described by the terminal apparatus 100. For example, the "exhibit description history" stores an exhibit ID for identifying an exhibit in association with each user ID. Accordingly, it becomes possible for the terminal apparatus 100 to avoid repeatedly describing the same exhibit.

Further, it is assumed that the exhibit information obtaining unit 405 updates the exhibit information 412 illustrated in FIG. 5A to exhibit information 412 illustrated in FIG. 5C. In the exhibit information 412 illustrated in FIG. 5C, an exhibit placed on the west side of the area ID "AREA001" is changed from the "exhibit 103b" to an "exhibit 103h." In this case, the execution control unit 404 of the terminal apparatus 100 permits the terminal apparatus 100 to describe the exhibit 103h.

Referring back to FIG. 4, the functional configuration of the terminal apparatus 100 continues to be described.

The display input control unit 408 is implemented by an application that is executed by the CPU 201, for example. The display input control unit 408 controls display of a screen on the display input unit 205 and controls reception of an operation performed by the user 101 via the display input unit 205. For example, when the user 101 starts using the terminal apparatus 100, the display input control unit 408 causes the display input unit 205 to display an input screen for inputting user information such as a user ID. Then, the display input control unit 408 receives the user ID input by the user 101 and stores the user ID in the user information 415 of the memory 411.

The speech recognition unit 409 is implemented by an application that is executed by the CPU 201, for example. The speech recognition unit 409 analyzes the user 101's voice obtained by the microphone unit 206, and extracts operation information for operating the terminal apparatus 100, strings, and the like. Accordingly, it becomes possible for the terminal apparatus 100 to receive not only input operations via the display input unit 205, but also receive predetermined operations via the user's voice.

The communication unit 410 is implemented by a program that is executed by the CPU 201, the communication I/F 204, and the like. For example, the communication unit 410 connects the terminal apparatus 100 to the communication network 421 such as the Internet and the LAN so as to communicate with the management server 420.

The memory 411 is implemented by a program that is executed by the CPU 201, the flash ROM 203, the RAM 202, and the like. The memory 411 stores various types of information including the exhibit information 412, the history information 413, and the user information 415. The memory 411 also stores terminal information 414 such as identification information for identifying the terminal apparatus 100 (hereinafter referred to as a terminal ID).

The functional configuration of the terminal apparatus 100 illustrated in FIG. 4 is an exemplary functional configuration of the information processing system 1. For example, a part of the functional configuration included in the terminal apparatus 100 may be included in the management server 420.

<Process Flows>

Next, process flows of an information processing method performed by the information processing system 1 and the terminal apparatus 100 according to the first embodiment will be described.

Figure 6A:
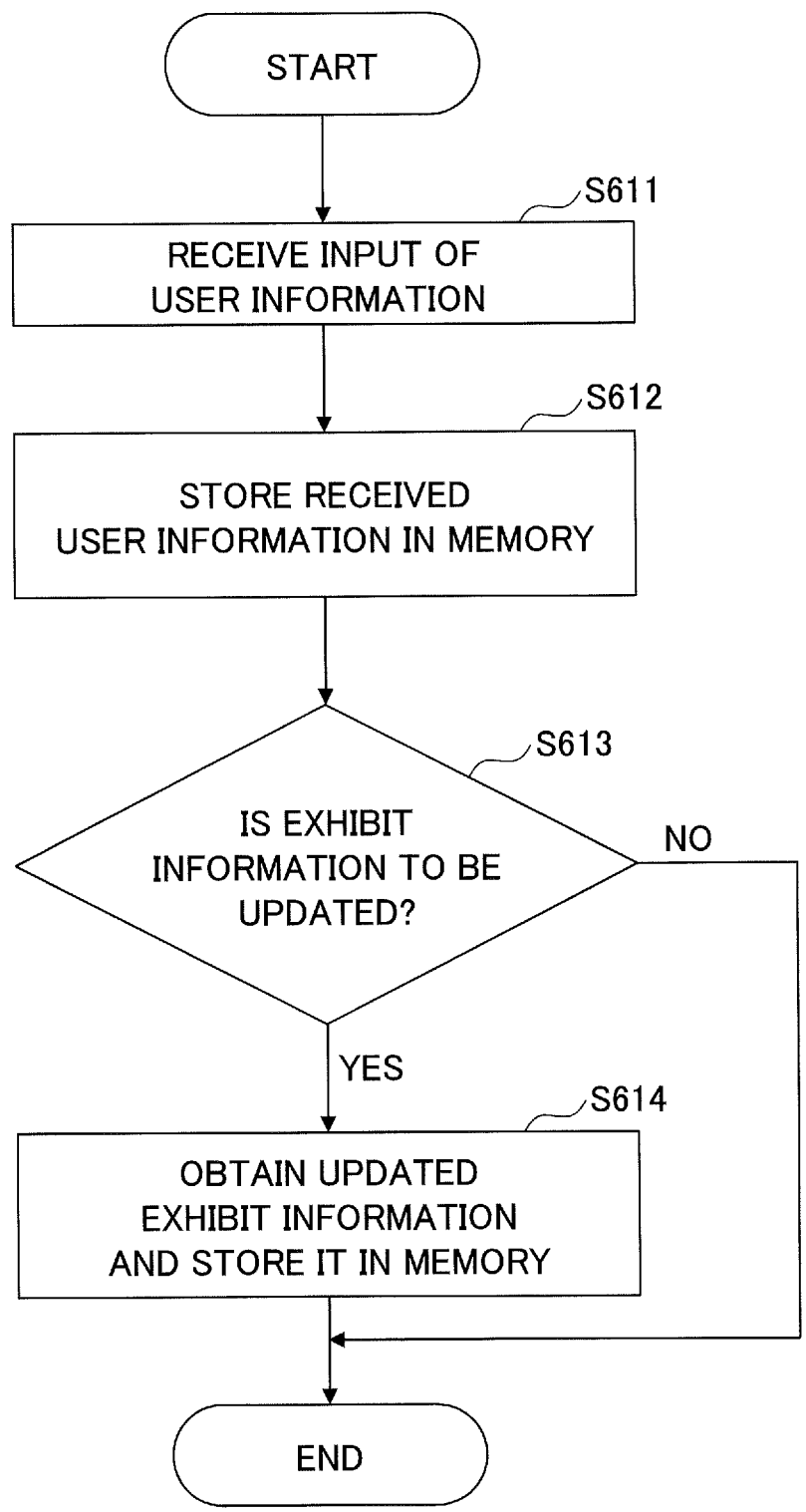
FIGS. 6A and 6B are flowcharts illustrating processes performed by the terminal apparatus according to the first embodiment.
Figure 6B:
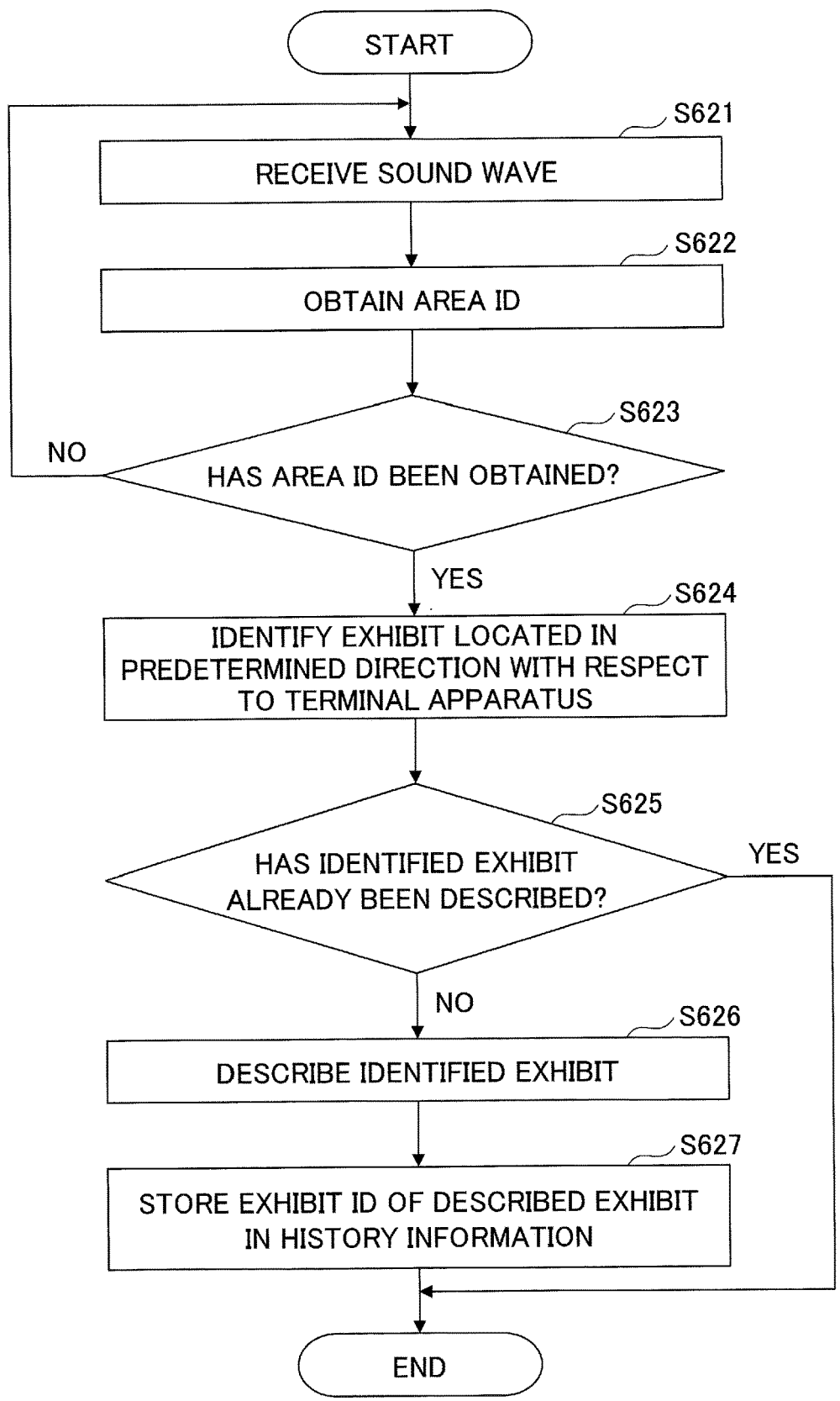

FIGS. 6A and 6B are flowcharts illustrating examples of processes performed by the terminal apparatus according to the first embodiment. FIG. 6A illustrates an example of a start process performed by the terminal apparatus 100 when the user 101 starts using the terminal apparatus 100 in the facility 10. FIG. 6B illustrates an example of a process performed by the terminal apparatus 100 after the start process is performed.

(Start Process Performed by Terminal Apparatus)

In step S611 of FIG. 6A, the terminal apparatus 100 receives user information input by the user 101 who uses the terminal apparatus 100. For example, when the user 101 starts using the terminal apparatus 100, the display input control unit 408 of the terminal apparatus 100 causes the display input unit 205 to display the input screen for inputting a user ID (an example of user information) and receives the user ID input by the user 101.

In step S612, the display input control unit 408 of the terminal apparatus 100 stores the received user ID in the user information 415 of the memory 411.

In step S613, the exhibit information obtaining unit 405 of the terminal apparatus 100 communicates with the management server 420 by using, for example, the communication unit 410, and determines whether exhibit information 412 stored in the memory 411 is to be updated.

When the exhibit information 412 is not to be updated, the terminal apparatus 100 ends the start process. When the exhibit information 412 is to be updated, the exhibit information obtaining unit 405 causes the process to proceed to step S614.

In step S614, the exhibit information obtaining unit 405 obtains the updated exhibit information 412 from the management server 420, and stores the updated exhibit information 412 in the memory 411.

Note that steps S613 and S614 are merely exemplary and are not required. For example, the latest information such as persons in charge at the facility 10 may be stored in the exhibit information 412 of the terminal apparatus 100 before the terminal apparatus 100 is lent to the user 101.

(Process 1 Performed by Terminal Apparatus)

In step S621 of FIG. 6B, the signal receiving unit 401 of the terminal apparatus 100 receives a sound wave around the terminal apparatus 100 by using the microphone unit 206. In the example of FIG. 1, the signal receiving unit 401 of the terminal apparatus 100 receives a sound wave including the area ID "AREA001" output from the output apparatus 110*a*.

In step S622, the identification information obtaining unit 402 of the terminal apparatus 100 analyzes the sound wave received by the signal receiving unit 401, and obtains an area ID included in the sound wave. In the example of FIG. 1, the identification information obtaining unit 402 of the terminal apparatus 100 obtains the area ID "AREA001" from the sound wave received by the signal receiving unit 401.

In step S623, the terminal apparatus 100 determines whether the identification information obtaining unit 402 has obtained the area ID. When the area ID has not been obtained, the terminal apparatus 100 causes the process to return to step S621, and performs the process again. When the area ID has been obtained, the terminal apparatus 100 causes the process to proceed to step S624.

In step S624, based on the area ID obtained by the identification information obtaining unit 402 and arrangement information included in the exhibit information 412 stored in the memory 411, the positional relationship identifying unit 403 of the terminal apparatus 100 identifies an exhibit located in a predetermined direction with respect to the terminal apparatus 100. In the following description, the predetermined direction is regarded as a direction in which the terminal apparatus 100 is facing (for example, a direction to which the face of the terminal apparatus 100 is directed). However, the present invention is not limited thereto. For example, the positional relationship identifying unit 403 may identify a direction pointed out by the terminal apparatus 100 or may identify a line-of-sight direction of the terminal apparatus 100, which is the robot information terminal.

In the example of FIG. 1, for example, the positional relationship identifying unit 403 detects that the terminal apparatus 100 is facing the south direction by using the sensor unit 209. Further, based on the area ID "AREA001" obtained by the identification information obtaining unit 402 and the arrangement information included in the exhibit information 412, the positional relationship identifying unit 403 identifies that an exhibit located in the (south) direction in which the terminal apparatus 100 is facing is the exhibit 103*c*.

In step S625, the control unit 404 of the terminal apparatus 100 determines whether the exhibit identified by the positional relationship identifying unit 403 is an exhibit that has already been described. For example, when the exhibit ID "ITEM003" of the exhibit 103*c* identified by the positional relationship identifying unit 403 is included in the "exhibit description history" of the history information 413 as illustrated in FIG. 5, the execution control unit 404 determines that the identified exhibit has already been described. When the exhibit ID "ITEM003" of the exhibit 103*c* identified by the positional relationship identifying unit 403 is not included in the "exhibit description history" of the history information 413, the execution control unit 404 determines that the identified exhibit has not been described yet.

When the identified exhibit has already been described, the execution control unit 404 prohibits the terminal apparatus 100 from describing the exhibit that has already been described and ends the process. When the identified exhibit has not been described, the execution control unit 404 causes the process to proceed to step S626.

In step S626, the execution control unit 404 causes the terminal apparatus 100 to describe the identified exhibit. For example, the execution control unit 404 reads audio data included in the "description information" of the exhibit information 412 as illustrated in. FIG. 5A. Then, the execution control unit 404 uses the speaker unit 207 to output audio included in the "description information". Accordingly, for example, in FIG. 1, the terminal apparatus 100 can describe the exhibit 103*c* to the user 101.

In step S627, the execution control unit 404 stores the exhibit ID of the exhibit described in step S626 in the "exhibit description history" of the history information 413. For example, when the exhibit 103*c* is described to the user 101 having the user ID "USER001," the execution control unit 404 stores the exhibit ID "ITEM003" in the "exhibit description history" that corresponds to the user ID "USER001" in the history information 413.

By repeatedly performing the above-described process, the terminal apparatus 100 can describe the exhibits 103*a* through 103*g* arranged in the areas 102*a* and 102*b* of the facility 10.

(Process 2 Performed by Terminal Apparatus)

Figure 7:
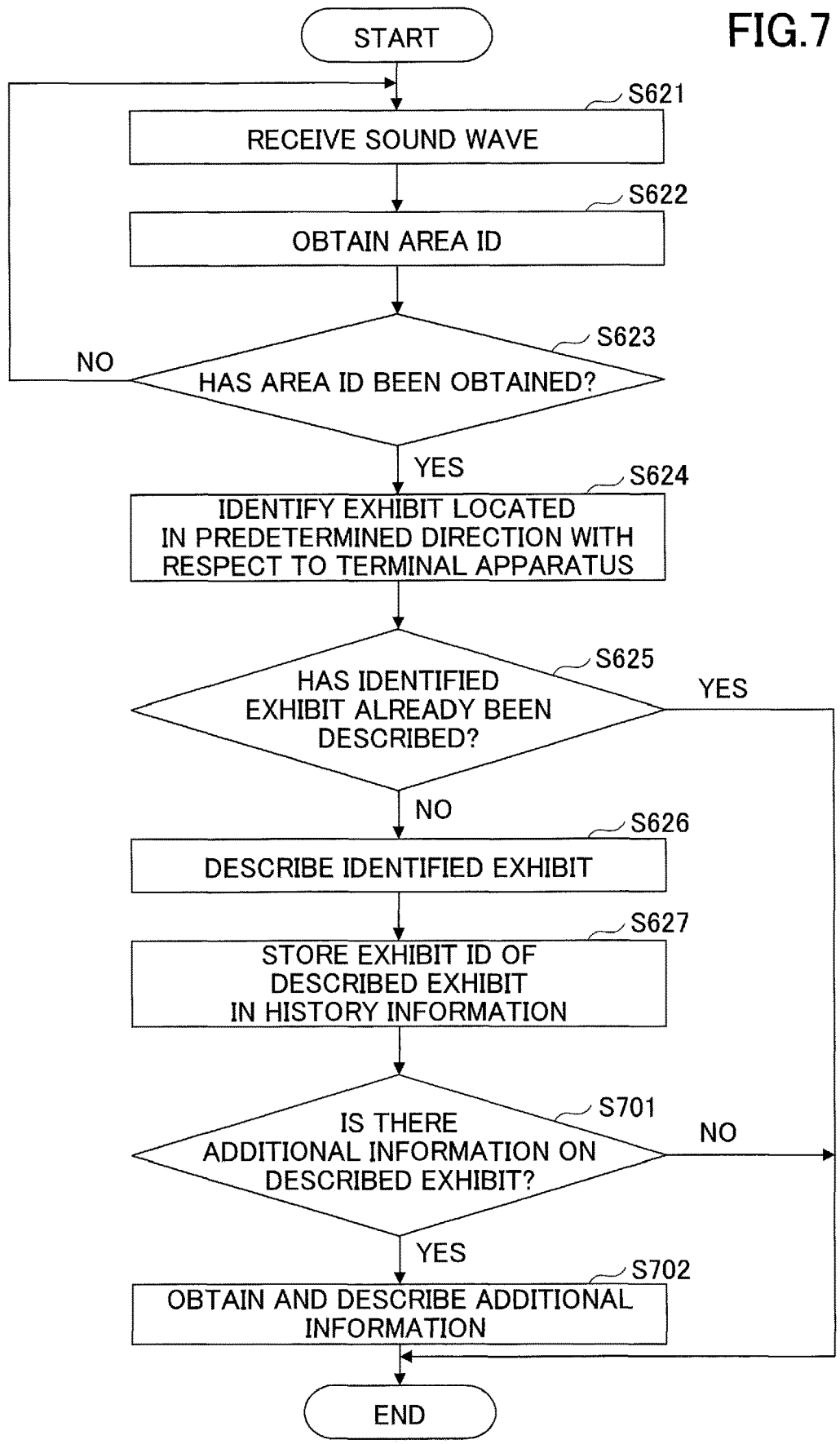
FIG. 7 is a flowchart illustrating an example of a process performed by the terminal apparatus according to the first embodiment.

FIG. 7 is a flowchart illustrating an example of a process performed by the terminal apparatus according to the first embodiment. FIG. 7 illustrates an example of a process in which the terminal apparatus 100 describes additional information obtained by the additional information obtaining unit 406, in addition to performing the process illustrated in FIG. 6. Steps S621 through S627 illustrated in FIG. 7 are the same as those in FIG. 6B. Thus, differences from the process illustrated in FIG. 6B will be mainly described below.

In step S701, the terminal apparatus 100 communicates with the management server 420 via the communication unit 410, and determines whether there is additional information on the described exhibit.

When there is no additional information on the described exhibit, the terminal apparatus 100 ends the process. When there is additional information on the described exhibit, the additional information obtaining unit 406 causes the process to proceed to step S702.

In step S702, the additional information obtaining unit 406 of the terminal apparatus 100 obtains additional information from the management server 420, and stores the obtained additional information in the "additional information" of the exhibit information 412 as illustrated in FIG. 5A, for example. Also, the execution control unit 404 reads audio data stored in the "additional information" that corresponds to the exhibit ID of the exhibit information 412, and outputs audio stored in the "additional information" by using the speaker unit 207.

Accordingly, it becomes possible for the terminal apparatus 100 to provide the user 101 with information that is difficult to be preliminarily stored in the memory 411, such as current weather information and event information.

(Process 3 Performed by Terminal Apparatus)

Figure 8:
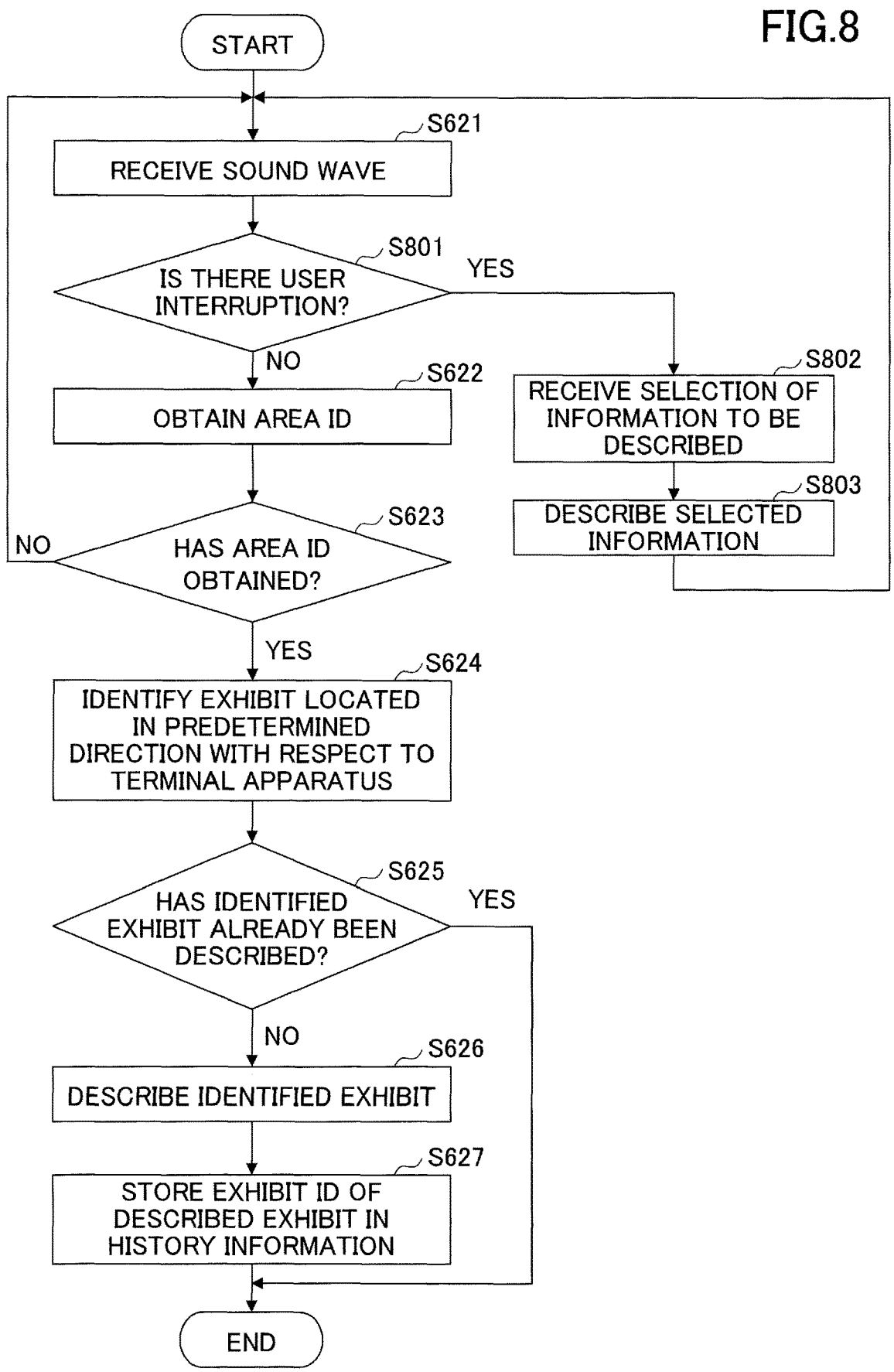
FIG. 8 is a flowchart illustrating an example of a process performed by the terminal apparatus according to the first embodiment.

FIG. 8 is a flowchart illustrating an example of a process performed by the terminal apparatus according to the first embodiment. FIG. 8 illustrates an example of a process in which there is an interruption to the terminal apparatus 100 by user 101. Steps S622 through S627 illustrated in FIG. 8 are the same as those in FIG. 6B. Thus, differences from the process illustrated in FIG. 6B will be mainly described below.

In step S801, the terminal apparatus 100 determines whether there is a user interruption. For example, the speech recognition unit 409 of the terminal apparatus 100 performs speech recognition processing for the sound wave received by the signal receiving unit 401. For example, when predetermined speech such as "How is the weather outside?" or "Is there any event?" is recognized, the terminal apparatus 100 determines that there is a user interruption. Alternatively, when a predetermined operation is performed on the display input unit 205 of the terminal apparatus 100, the display input control unit of the terminal apparatus 100 may determine that there is an interruption.

When there is no interruption, the terminal apparatus 100 causes the process to proceed to step S622. When there is an interruption, the terminal apparatus 100 causes the process to proceed to step S802.

In step S802, the terminal apparatus 100 receives the user 101's selection of information to be described. For example, when speech related to weather such as "How is the weather outside?" is recognized by the speech recognition unit 409, the terminal apparatus 100 receives selection of "weather" as information to be described. Also, when speech related to "event" such as "Is there any event?" is recognized by the speech recognition unit 409, the terminal apparatus 100 receives selection of an "event" as information to be described.

Alternatively, the display input control unit 408 of the terminal apparatus 100 may cause the display input unit 205 to display a selection screen for selecting information to be described, and the terminal apparatus 100 may obtain information selected by the user 101.

In step S803, the terminal apparatus 100 describes the selected information. For example, when "weather" is selected as information to be described, the additional information obtaining unit 406 of the terminal apparatus 100 obtains weather information from the management server 420, and the execution control unit 404 causes the terminal apparatus 100 to describe the obtained weather information.

After the description is complete, the terminal apparatus 100 causes the process to return to step S621, and starts the process again. With the above-described process, the terminal apparatus 100 can interactively communicate with the user.

(Process Performed by Information Processing System)

Figure 9:
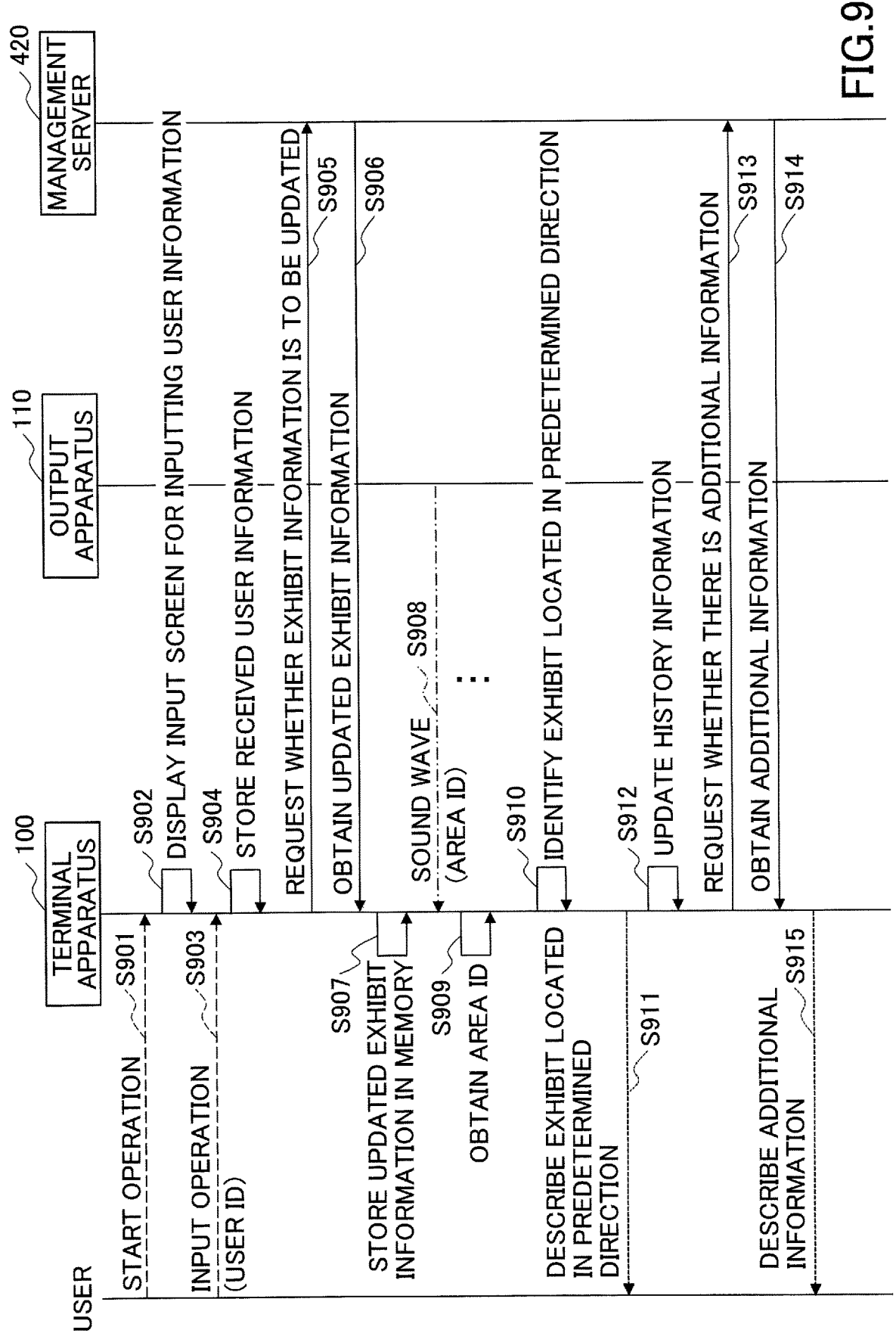
FIG. 9 is a sequence diagram illustrating an example of a process performed by the information processing system according to the first embodiment.

FIG. 9 is a sequence diagram illustrating a process performed by the information processing system according to the first embodiment. FIG. 9 illustrates an example of the entire process performed by the information processing system 1. Steps illustrated in FIG. 9 correspond to the steps illustrated in FIG. 6A and FIG. 7; thus, a detailed description will be omitted.

In step S901, the user 101 performs a start operation (such as turning on the power of starting an application) of the terminal apparatus 100 lent from the facility 10.

In step S902, the display input control unit 408 of the terminal apparatus 100 causes the display input unit 205 to display the input screen for inputting user information.

In step S903, the user 101 performs an input operation on the input screen for inputting user information (such as a user ID).

In step S904, the display input control unit 408 of the terminal apparatus 100 receives the user information 415 input by the user 101. Then, the display input control unit 408 stores the received user information 415 in the memory 411. Steps S901 through S904 correspond to steps S611 and S612.

In step S905, the exhibit information obtaining unit 405 of the terminal apparatus 100 requests of the management server 420 via the communication unit 410 whether there are updates for the exhibit information 412.

When there are updates for the exhibit information 412, the exhibit information obtaining unit 405 obtains the updated exhibit information 412 from the management server 420 in step S906, and stores the updated exhibit information 412 in the memory 411 in step S907. Further, steps 905 through 907 correspond to steps S613 and S614 of FIG. 6A.

In step S908, sound wave including an area ID output from the output apparatus 110 is received by the terminal apparatus 100.

In step S909, the signal receiving unit 401 of the terminal apparatus 100 obtains the sound wave output from the output apparatus 110. The identification information obtaining unit 402 obtains the area ID included in the obtained sound wave. Steps S908 and S909 correspond to steps S621 and S622.

In step S910, the positional relationship identifying unit 403 of the terminal apparatus 100 identifies an exhibit located in a predetermined direction with respect to the terminal apparatus 100. For example, the positional relationship identifying unit 403 identifies an exhibit located in a direction to which the face of the terminal apparatus 100, which is the robot information terminal, is directed. This step corresponds to step S624 of FIG. 6B.

In step S911, when the exhibit located in the predetermined direction has not been described yet, the execution control unit 404 of the terminal apparatus 100 causes the terminal apparatus 100 to describe the exhibit located in the predetermined direction. This step corresponds to steps S625 and S626 of FIG. 6B.

In step S912, the execution control unit 404 of the terminal apparatus 100 stores an exhibit ID of the described exhibit, and updates the history information 413. This step corresponds to step S627 of FIG. 6, for example.

In step S913, the additional information obtaining unit 406 of the terminal apparatus 100 requests of the management server 420 via the communication unit 410 whether there is additional information.

When the management server 420 has additional information, the additional information obtaining unit 406 obtains the additional information from the management server 420 in step S914. Then, the execution control unit 404 causes the terminal apparatus 100 to describe the additional information in step S915.

As described, according to the present embodiment, in the terminal apparatus 100 for providing a description about the one or more exhibits 103a through 103g arranged in the predetermined area, it becomes possible to describe the exhibits 103a through 103g in accordance with the user 101's interest or intention.

Second Embodiment

In a second embodiment, an example in which in addition to the terminal apparatus 100 that is the robot information terminal, an exhibit that also performs predetermined actions will be described.

<System Configuration>

Figure 10:
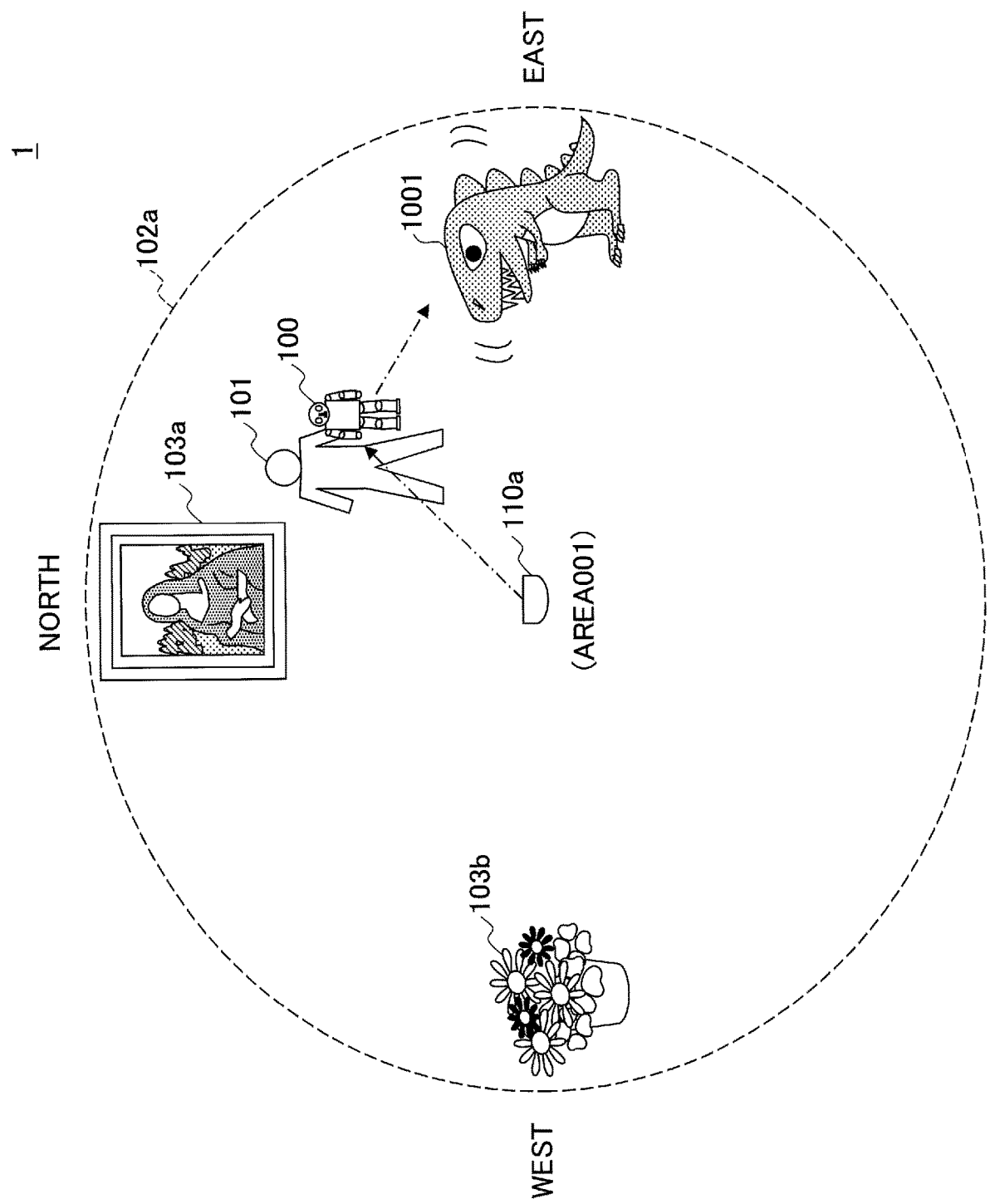
FIG. 10 is a diagram illustrating an exemplary system configuration of an information processing system according to a second embodiment.

FIG. 10 illustrates an exemplary system configuration of an information processing system according to the second embodiment. An area 102a illustrated in FIG. 10 is one of the areas 102a and 102b, for example. In FIG. 10, the output apparatus 110a intermittently outputs a sound wave including an area ID "AREA001" in the area 102a at a predetermined time interval. Also, in addition to the exhibit 103a and the exhibit 103b, the area 102a includes an exhibit 1001 that receives a sound wave including predetermined control information and performs a predetermined action in accordance with the received control information.

In FIG. 10, the terminal apparatus 100 possessed by a user 101 is a robot information terminal, for example. The terminal apparatus 100 obtains an area ID included in a sound wave output from the output apparatus 110. When the terminal apparatus 100 obtains the area ID, the terminal apparatus 100 outputs a sound wave including a terminal ID of the terminal apparatus 100 for a period of time in which no sound wave is output from the output apparatus 110. The terminal ID of the terminal apparatus 100 is an example of the predetermined control information.

Further, in FIG. 10, the exhibit 1001 is a dinosaur-shaped exhibit, for example. When the exhibit 1001 receives a sound wave including a terminal ID output from the terminal apparatus 100, the exhibit 1001 performs a predetermined action (for example, roaring, causing the eyes to glow, or wagging the tail). Accordingly, for example, when the user 101 possessing the terminal apparatus 100 enters the area 102a, the exhibit 1001 can automatically perform a predetermined action.

Figure 11:
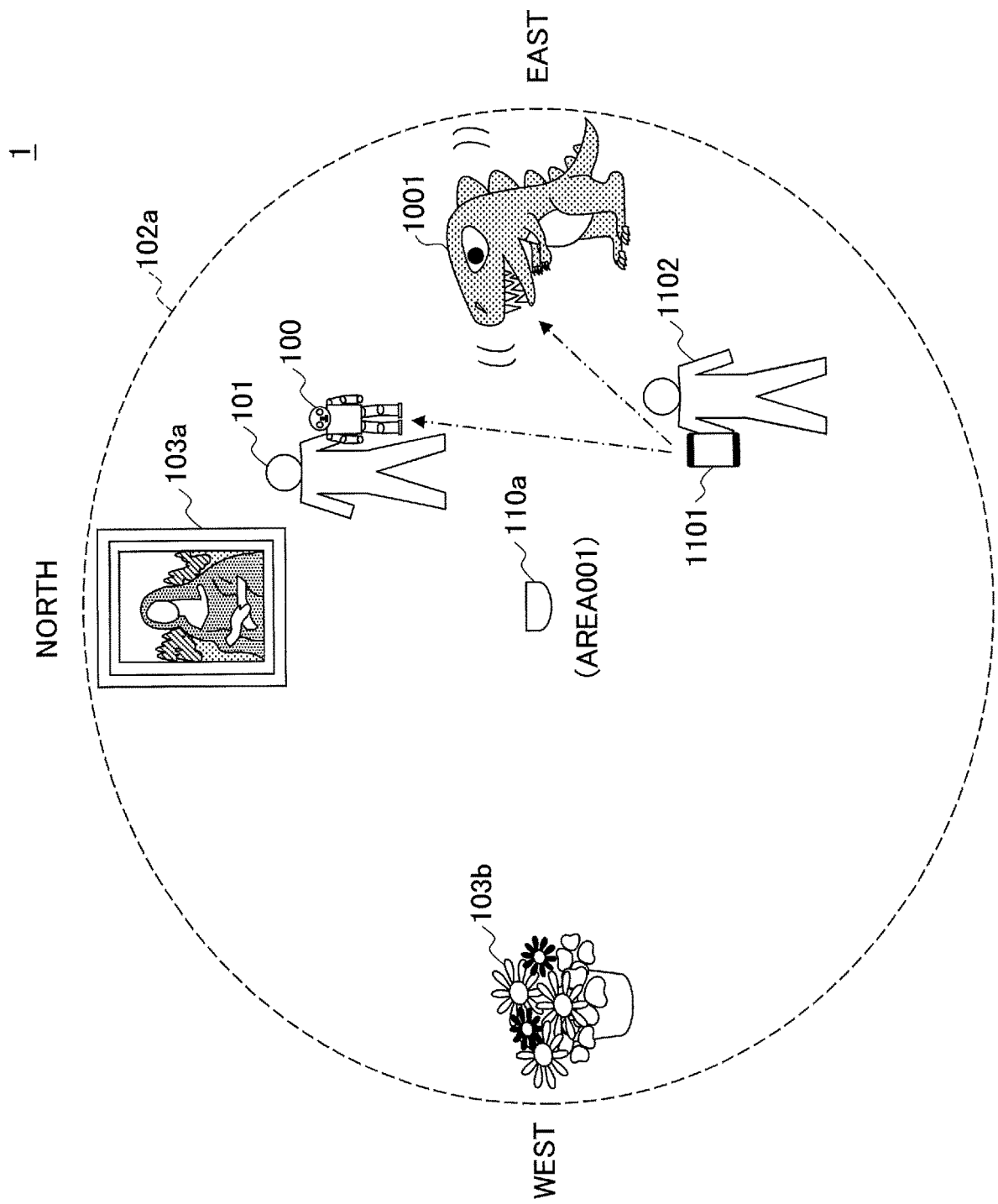
FIG. 11 is a diagram illustrating another exemplary system configuration of the information processing system according to the second embodiment.

FIG. 11 illustrates another exemplary system configuration of the information processing system according to the second embodiment. Similarly to FIG. 10, the area 102a illustrated in FIG. 11 includes the exhibit 1001 that receives a sound wave including predetermined control information and performs a predetermined action in accordance with the received control information.

In FIG. 11, an operator 1102 who is personnel of the facility 10 can use an operator terminal 1101 to output a sound wave including identification information for identifying predetermined action (hereinafter referred to as an action ID) for a period of time in which no sound wave is output from the output apparatus 110. The action ID is an example of the predetermined control information.

Also, in FIG. 11, the exhibit 1001 is a dinosaur-shaped exhibit, for example. When the exhibit 1001 receives a sound wave including an action ID output from the operator terminal 1101, the exhibit 1001 performs an action corresponding to the action ID. Further, when the terminal apparatus 100, which is the robot information terminal and is possessed by the user 101, receives the sound wave including the action ID output from the operator terminal 1101, the terminal apparatus 100 performs a predetermined action corresponding to the action ID. Accordingly, in accordance with a sound wave including an action ID output from the operator terminal 1101, a predetermined event can be performed, such as an event in which the terminal apparatus 100, which is the robot information terminal, screams when the dinosaur-shaped exhibit 1001 roars loudly.

<Functional Configuration>

Figure 12:
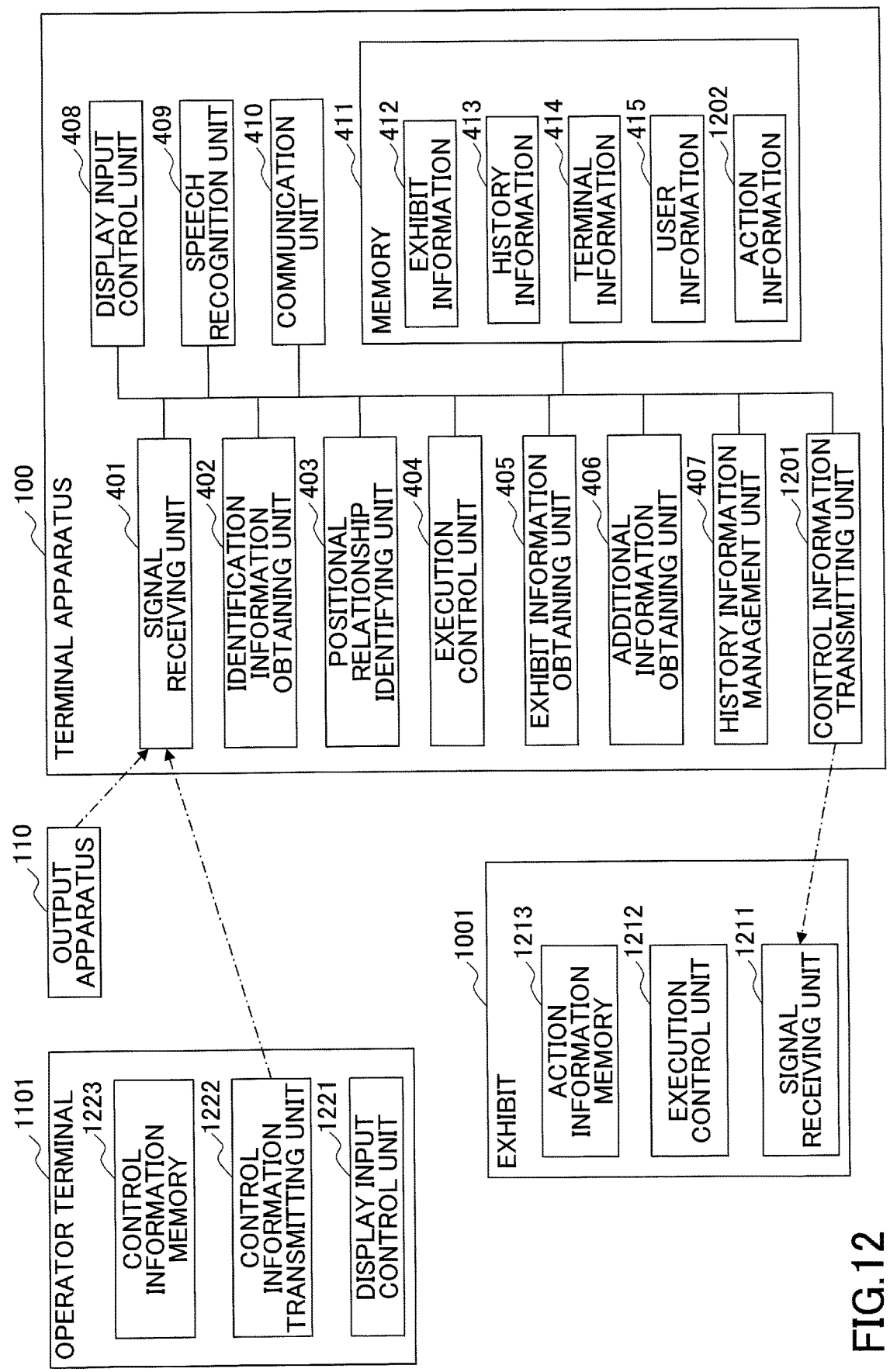
FIG. 12 is a diagram illustrating a functional configuration of the information processing system according to the second embodiment.

FIG. 12 is a diagram illustrating an example of a functional configuration of the information processing system according to the second embodiment.

(Functional Configuration of Terminal Apparatus)

The basic functional configuration of the terminal apparatus 100 according to the second embodiment is similar to the function configuration of the terminal apparatus 100 according to the first embodiment illustrated in FIG. 4. In the following, differences from the functional configuration of the terminal apparatus 100 according to the first embodiment will be mainly described.

In addition to the functional configuration of the terminal apparatus 100 according to the first embodiment illustrated in FIG. 4, the terminal apparatus 100 according to the second embodiment also includes a control information transmitting unit 1201. Also, in addition to the various types of information stored in the memory 411 according to the first embodiment illustrated in FIG. 4, the memory 411 of the terminal apparatus 100 according to the second embodiment also stores action information 1202.

The control information transmitting unit 1201 is implemented by an application that is executed by the CPU 201, for example. When the identification information obtaining unit 402 obtains a new area ID, the control information transmitting unit 1201 outputs a sound wave including a terminal ID of the terminal apparatus 100.

Preferably, the control information transmitting unit 1201 outputs a sound wave including a terminal ID of the terminal apparatus 100 for a period of time in which a sound wave, which is intermittently output from the output apparatus 110, is not output.

Preferably, the control information transmitting unit 1201 stores, in the history information 413 of the memory 411, an area ID of an area in which a sound wave including a terminal ID is output. When an area ID obtained by the identification information obtaining unit 402 is already stored in the history information 413, the control information transmitting unit 1201 does not output a sound wave including a terminal ID.

Further, the memory 411 according to the present embodiment stores the action information 1202 in which predetermined actions are each associated with a corresponding action ID. Further, when the identification information obtaining unit 402 obtains an action ID from a sound wave received by the signal receiving unit 401, the execution control unit 404 according to the present embodiment causes the terminal apparatus 100 to perform an action corresponding to the obtained action ID.

FIGS. 13A through 13E are tables illustrating examples of information managed by the information processing system according to the second embodiment.

FIG. 13A illustrates an example of exhibit information 412 stored in the memory 411 by the terminal apparatus 100 according to the second embodiment. As illustrated in FIG. 13A, the exhibit information 412 according to the second embodiment includes "action" information indicating an action of an exhibit. The "action" information stores predetermined action performed by an exhibit when the exhibit receives a sound wave including a terminal ID. For example, when an exhibit having an exhibit ID "ITEM101" receives a sound wave including a terminal ID, actions of "roaring," "causing the eyes to glow," and "wagging the tail" are sequentially or randomly performed. Although not illustrated in the exhibit information 412 of FIG. 13A, "additional information" may also be included in the exhibit information 412 according to the second embodiment.

FIG. 13B illustrates an example of history information 413 stored in the memory 411 by the terminal apparatus 100 according to the second embodiment. As illustrated FIG. 13B, history information according to the second embodiment includes information such as "terminal ID transmission history" and "action ID reception history". The "terminal ID transmission history" stores an area ID of an area in which the terminal apparatus 100 outputs a sound wave including a terminal ID. Thus, the terminal apparatus 100 is controlled such that a sound wave including a terminal ID is not repeatedly output in the same area. The "action ID reception history" stores an action ID that has already been received.

Thus, the terminal apparatus 100 is controlled such that the same action is not repeatedly performed every time the same action ID is received.

FIG. 13C illustrates an example of action information 1202 stored in the memory 411 by the terminal apparatus 100 according to the second embodiment. As illustrated in FIG. 13C, for example, the action information 1202 includes information such as "action ID" and "action". For example, the "action ID" is identification information for identifying an action, and is included in a sound wave output from the operator terminal 1101. The "action" stores an action associated with an action ID. In the example of FIG. 13C, when the terminal apparatus 100, which is the robot information terminal, receives a sound wave including an action ID "ACT001," the terminal apparatus 100 performs an action of "waving the hand".

Referring back to FIG. 12, the functional configuration of the exhibit 1001 will be described.

(Functional Configuration of Exhibit)

The exhibit 1001 includes a hardware configuration similar to that of the terminal apparatus 100 illustrated in FIG. 2. The exhibit 1001 implements a signal receiving unit 1211, an execution control unit 1212, and an action information memory 1213 by causing a CPU 201 to execute predetermined programs.

For example, the signal receiving unit 1211 receives a sound wave picked up by a microphone unit 206, and obtains identification information (for example, a terminal ID or an action ID) included in the received sound wave. For example, in accordance with action information 1301 stored in the action information memory 1213 as illustrated in FIG. 13D, the execution control unit 1212 causes the exhibit 1001 to perform an action corresponding to the identification information obtained by the signal receiving unit 1211.

FIG. 13D illustrates an example of the action information 1301 stored in the action information memory 1213 of the exhibit 1001. As illustrated in FIG. 13D, the action information 1301 includes information such as "identification information" and "action". For example, the "identification information" is identification information such as an action ID included in a sound wave output from the operator terminal 1101 or a terminal ID included in a sound wave output from the terminal apparatus 100. The "action" stores information indicating an action associated with corresponding "identification information". For example, in the example of FIG. 13D, when identification information obtained by the signal receiving unit 1211 is the action ID "ACT001," the exhibit 1001 performs an action of "causing the eyes to glow". Also, when identification information obtained by the signal receiving unit 1211 is a terminal ID, the exhibit 1001 sequentially or randomly performs actions of "roaring," "causing the eyes to glow," and "wagging the tail".

(Functional Configuration of Operator Terminal)

The operator terminal 1101 includes a hardware configuration similar to that of the terminal apparatus 100 illustrated in FIG. 2. The operator terminal 1101 implements a display input control unit 1221, a control information transmitting unit 1222, and a control information memory 1223 by causing a CPU 201 to execute predetermined programs.

Based on control information stored in the control information memory 1223, the display input control unit 1221 causes a display input unit 205 to display a selection screen for selecting an event to be performed, and obtains an action ID corresponding to the selected event from control information. By using a speaker unit 207, the control information transmitting unit 1222 outputs a sound wave including the action ID obtained by the display input control unit 1221.

FIG. 13E illustrates an example of control information 1302 stored in the control information memory 1223 of the operator terminal 1101. As illustrated in FIG. 13E, the control information 1302 stores "action ID" in association with "action". The "action ID" is identification information for identifying an action (an event) to be performed by the exhibit 1001 or by the terminal apparatus 100. The "action" stores an event description or an event name associated with a corresponding action ID.

<Process Flow>

Next, a process flow performed by the information processing system 1 and the terminal apparatus 100 according to the second embodiment will be described.

Figure 14:
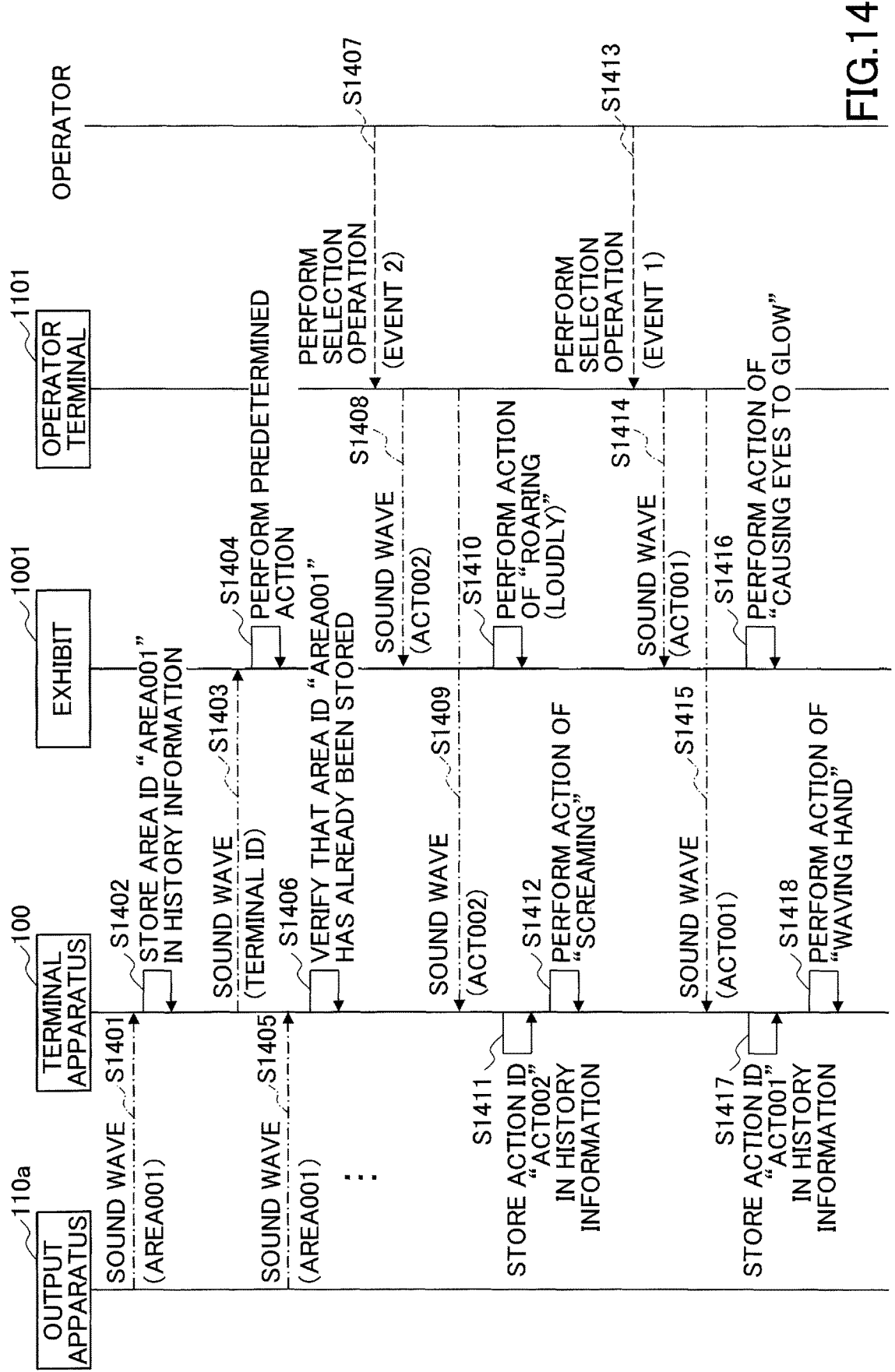
FIG. 14 is a sequence diagram illustrating an example of a process performed by the information processing system according to the second embodiment.

FIG. 14 is a sequence diagram illustrating an example of a process performed by the information processing system according to the second embodiment. FIG. 14 illustrates an example of a process performed by the information processing system 1 when the user 101 possessing the terminal apparatus 100, which is the robot information terminal, enters the area 102a as illustrated in FIG. 10 and FIG. 11. It is assumed that when the process illustrated in FIG. 14 starts, the area ID "AREA001" and action IDs "ACT002" and "ACT001" have not been stored in the history information 413 of the memory 411 in the terminal apparatus 100.

In steps S1401 and S1402, the signal receiving unit 401 of the terminal apparatus 100 receives a sound wave including the area ID "AREA001" output from the output apparatus 110a. Also, the identification information obtaining unit 402 of the terminal apparatus 100 obtains the area ID "AREA001" from the sound wave received by the signal receiving unit 401, and stores the obtained area ID in the "area ID reception history" of the history information 413 as illustrated in FIG. 13B, for example.

In step S1403, the control information transmitting unit 1201 of the terminal apparatus 100 outputs a sound wave including a terminal ID of the terminal apparatus 100, in accordance with the area ID obtained by the identification information obtaining unit 402. At this time, the signal receiving unit 1211 of the exhibit 1001 receives the sound wave output from the terminal apparatus 100 and obtains the terminal ID' included in the received sound wave.

In step S1404, based on the terminal ID obtained by the signal receiving unit 1211 and the action information 1301 as illustrated in FIG. 13D, the execution control unit 1212 of the exhibit 1001 causes the exhibit 1001 to perform a predetermined action. For example, the execution control unit 1212 causes the exhibit 1001 to randomly execute actions of "roaring," "causing the eyes to glow," and "wagging the tail" corresponding to the "terminal ID" of FIG. 13D.

With the above-described steps, for example, when the user 101 possessing the terminal apparatus 100 enters the area 102a as illustrated in FIG. 10, the dinosaur-shaped exhibit 1001 automatically performs a predetermined action.

Further, in step S1405, when the terminal apparatus 100 obtains a sound wave including the area ID "AREA001" again, the identification information obtaining unit 402 verifies that the area ID "AREA001" has already been stored in the history information 413 in step S1406. Thus, the terminal apparatus 100 does not output a sound wave including the terminal ID.

Next, in step S1407, the operator 1102 possessing the operator terminal 1101 as illustrated in FIG. 11 performs an operation of selecting an action "event 2," for example.

In steps S1408 and S1409, the display input control unit 1221 of the operator terminal 1101 obtains an action ID "ACT002" corresponding to the action "event 2" from the control information 1302 as illustrated in FIG. 13E. Also, the control information transmitting unit 1222 of the operator terminal 1101 outputs a sound wave including the action ID "ACT002" obtained by the display input control unit 1221.

In step S1410, the signal receiving unit 1211 of the exhibit 1001 obtains the action ID "ACT002" included in the sound wave output from the operator terminal 1101. Also, the execution control unit 1212 of the exhibit 1001 obtains, from the action information 1301 as illustrated in FIG. 13D, an action of "roaring (loudly)" corresponding to the action ID "ACT002" obtained by the signal receiving unit 1211, and causes the exhibit 1001 to perform the obtained action.

In step S1411, the identification information obtaining unit 402 of the terminal apparatus 100 obtains the action ID "ACT002" from the sound wave received by the signal receiving unit 401. Also, the identification information obtaining unit 402 stores the obtained action ID "ACT002" in the "action ID reception history" of the history information 413 as illustrated in FIG. 13B.

In step S1412, the execution control unit 404 of the terminal apparatus 100 obtains, from the action information 1202 as illustrated in FIG. 13C, an action of "screaming" corresponding to the action ID "ACT002" obtained by the identification information obtaining unit 402. Also, the execution control unit 404 causes the terminal apparatus 100, which is the robot information terminal, to execute the obtained action of "screaming".

Further, in step S1413, the operator 1102 possessing the operator terminal 1101 performs an operation of selecting an action "event 1".

As a result, in steps S1414 and S1415, the display input control unit 1221 of the operator terminal 1101 obtains the action ID "ACT001" corresponding to the action "event 1" from the control information 1302 as illustrated in FIG. 13E. Also, the control information transmitting unit 1222 of the operator terminal 1101 outputs a sound wave including the action ID "ACT001" obtained by the display input control unit 1221.

In step S1416, the signal receiving unit 1211 of the exhibit 1001 obtains the action ID "ACT001" included in the sound wave output from the operator terminal 1101. Also, the execution control unit 1212 of the exhibit 1001 obtains, from the action information 1301 as illustrated in FIG. 13D, an action of "causing the eyes to glow" corresponding to the action ID "ACT001" obtained by the signal receiving unit 1211, and causes the exhibit 1001 to perform the obtained action.

In step S1417, the identification information obtaining unit 402 of the terminal apparatus 100 obtains the action ID "ACT001" from the sound wave received by the signal receiving unit 401. Also, the identification information obtaining unit 402 stores the obtained action ID "ACT001" in the "action ID reception history" of the history information 413 as illustrated in FIG. 13B.

In step S1418, the execution control unit 404 of the terminal apparatus 100 obtains, from the action information 1202 as illustrated in FIG. 13C, an action of "waving the hand" corresponding to the action ID "ACT001" obtained by the identification information obtaining unit 402. Also, the execution control unit 404 causes the terminal apparatus 100, which is the robot information terminal, to perform the obtained action of "waving the hand".

With the above-described steps S1407 through S1418, it becomes possible for the terminal apparatus 100, which is the robot information terminal, and for the exhibit 1001, which is the dinosaur-shaped exhibit, to perform predetermined actions in accordance with an operation performed by the operator 1102 as illustrated in FIG. 11, for example.

As described, according to the information processing system of the second embodiment, in addition to the terminal apparatus 100, which is the robot information terminal, the exhibit 1001 can also perform a predetermined action. Accordingly, the information processing system 1 can control the terminal apparatus 100 and the exhibit 1001 as if robots communicate with each other.

Third Embodiment

In the first and second embodiments, the output apparatus 110a uses sound waves without directivity to form an approximately circular area 102a. However, the present invention is not limited thereto, and the output apparatus 110a may use sound waves with directivity to form an area 102a having a predetermined shape. In the third embodiment, an example in which the output apparatus 110 uses sound waves with directivity to form an area having a predetermined shape will be described.

<System Configuration>

Figure 15:
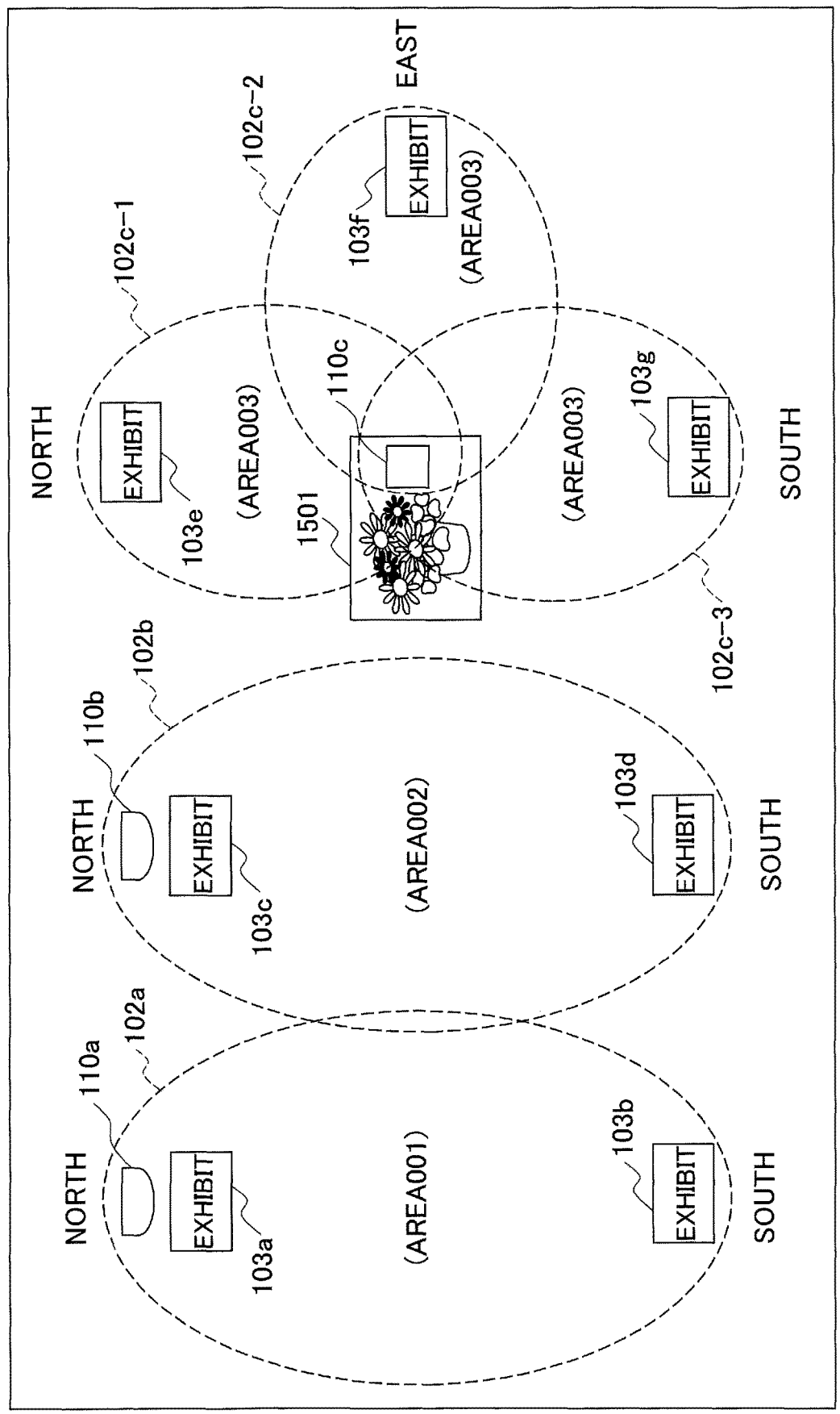
FIG. 15 is a diagram illustrating an exemplary system configuration of an information processing system according to a third embodiment.

FIG. 15 is a diagram illustrating an exemplary system configuration of an information processing system according to the third embodiment. In the example of FIG. 15, the output apparatus 110a is placed near an exhibit 103a. The output apparatus 110a uses sound waves having directivity towards the south to form an area 102a. The area 102a may include an exhibit 103a only, or may also include other exhibits (for example, an exhibit 103b) as illustrated in FIG. 15. In FIG. 15, similarly to the output apparatus 110a, the output apparatus 110b uses sound waves having directivity towards the south to form an area 102b.

Further, as another example, in FIG. 15, an output apparatus 110c is placed on a table 1501. The output apparatus 110c uses sound waves having directivity to form areas 102c-1, 102c-2, and 102c-3.

In the output apparatus 110 according to the third embodiment, an area can be formed in a predetermined direction by using sound waves having directivity. Accordingly, a plurality of areas can be formed in an outdoor facility. Thus, the present invention can be applied to an outdoor facility.

(Frequency of Sound Wave)

Figure 16:
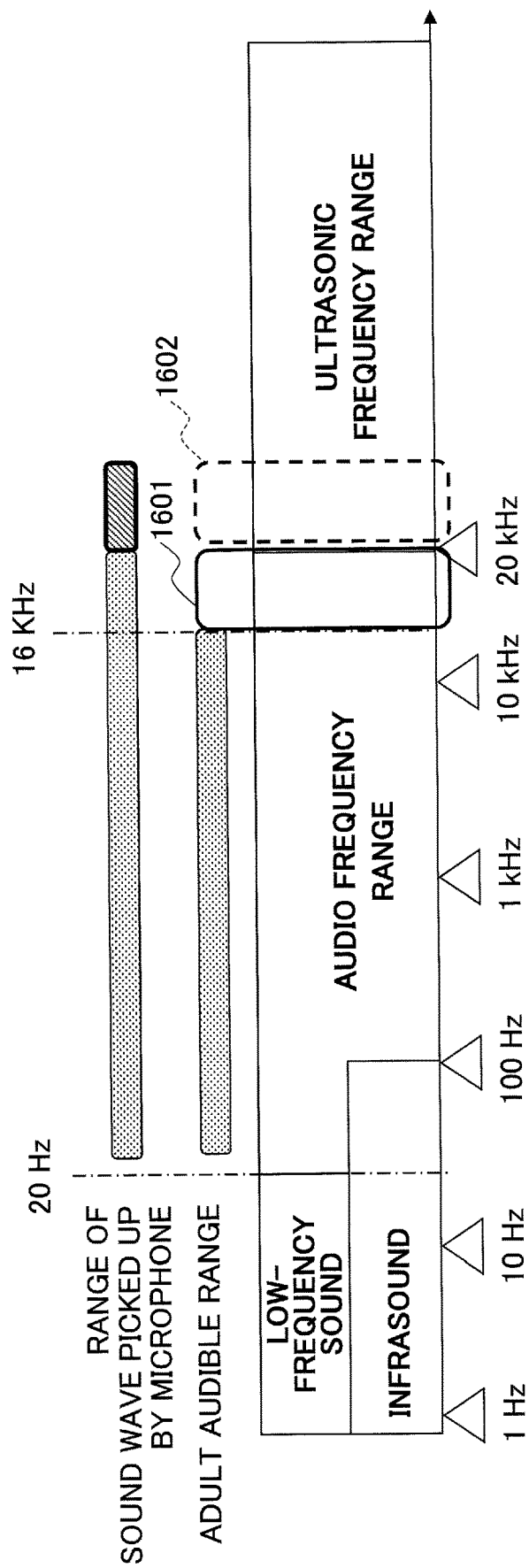
FIG. 16 is a drawing for explaining a frequency of a sound wave according to one embodiment.

FIG. 16 is a drawing for explaining a frequency of a sound wave according to one embodiment. A microphone mounted on a commonly available information terminal can pick up sound waves in the audio frequency range of 20 Hz to 20 kHz. In the audio frequency range of 20 Hz to 20 kHz, a frequency range greater than or equal to 16 kHz has high directivity and can be barely heard by humans. Thus, the frequency range greater than or equal to 16 kHz is preferably used when a sound wave including an area ID is output from the output apparatus 110.

Further, as the microphone mounted on the terminal apparatus 100, a microphone capable of picking up sound waves in the ultrasonic frequency range greater than or equal to 20 kHz may also be used. In this case, a predetermined frequency range 1602 greater than or equal to 20 kHz (for example, from 20 kHz to 24 kHz) has high directivity and can be barely heard by humans. Thus, the frequency range 1602 can be used when a sound wave including an area ID is output from the output apparatus 110.

Figure 17A:
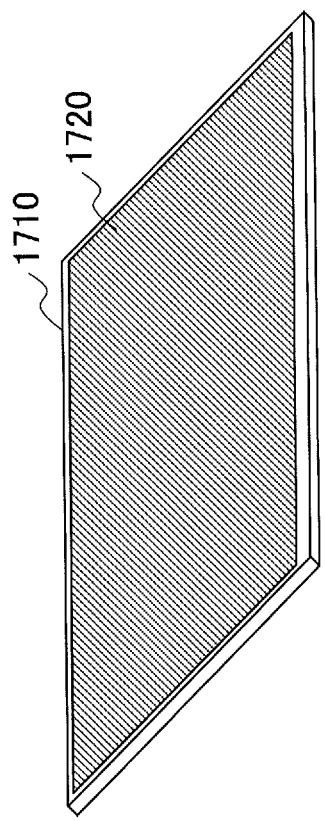
FIGS. 17A through 17C are drawings illustrating a flat speaker according to the third embodiment.
Figure 17B:
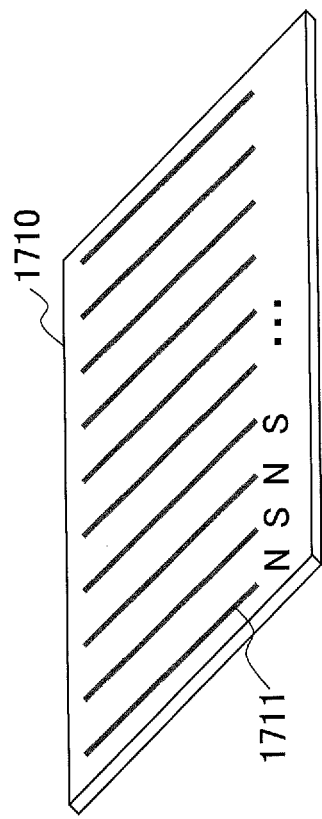
Figure 17C:
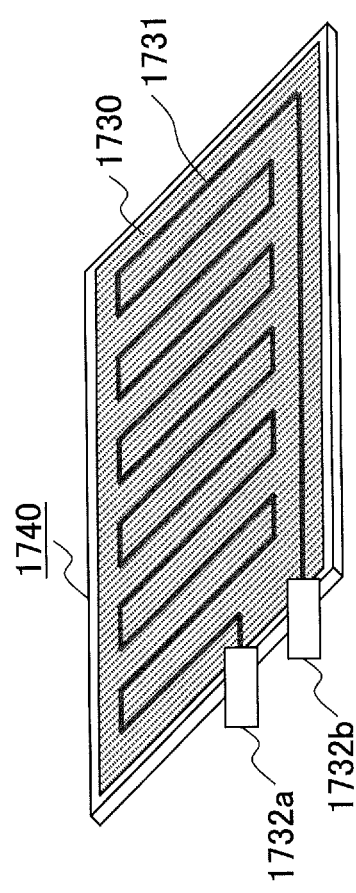

In order to output sound waves with a relatively high frequency, the output apparatus 110 is equipped with a flat speaker as illustrated in FIGS. 17A through 17C, for example.

FIGS. 17A through 17C are drawings illustrating the flat speaker according to the third embodiment. The flat speaker 1740 according to the present embodiment has a flat magnet (a magnet layer) 1710 as illustrated in FIG. 17A. In the example of FIG. 17A, rod-shaped permanent magnets 1711 are arranged with magnetic pole directions being alternately different. As an example, the permanent magnets 1711 may be embedded in the flat magnet 1710 by forming projections on the flat magnet 1710 in accordance with the thickness of the permanent magnets 1711.

Also, as illustrated in FIG. 17B, a buffer layer (a buffer member) 1720 is disposed to entirely or partially cover the upper surface of the flat magnet 1710. Further, as illustrated in FIG. 17C, a vibration plate (a first vibration plate) 1730 is disposed on the upper surface of the buffer layer 1720. The vibration plate 1730 is configured with a flexible substrate having a flat coil 1731. Namely, the vibration plate 1730 is coupled to the flat magnet 1710 via the buffer layer 1720.

By disposing the buffer layer 1720, it becomes possible to secure a movable range required for the vibration plate 1730 to vibrate with sufficient amplitude, while also preventing the flat magnet 1710 and the vibration plate 1730 from adhering to each other and preventing partial vibrations of the vibration plate 1730.

The output apparatus 110 according to the present embodiment includes the flat speaker (flat-type speaker) 1740 as illustrated in FIG. 17 and at least one plate-shaped member. The at least one plate-shaped member is attached to the vibration plate 1730 of the flat speaker 1740 as illustrated in FIGS. 18A and 18B.

Figure 18A:
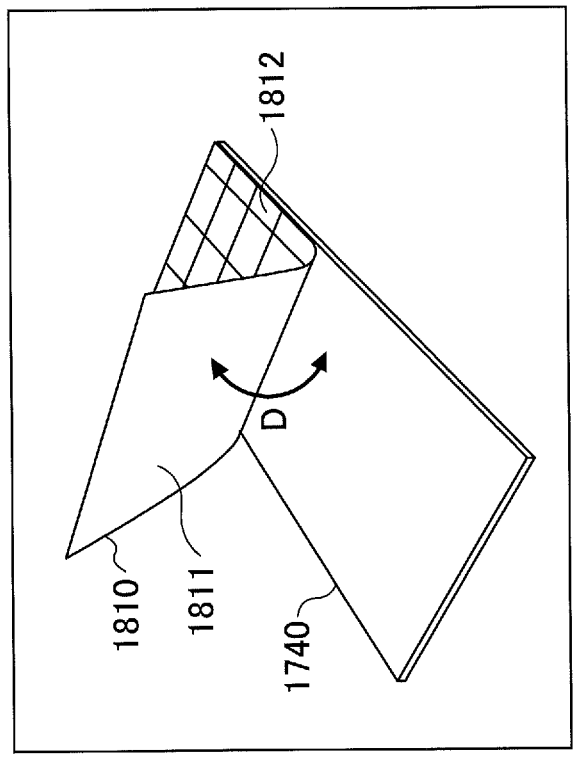
FIGS. 18A and 18B are drawings for explaining the output apparatus according to the third embodiment.
Figure 18B:
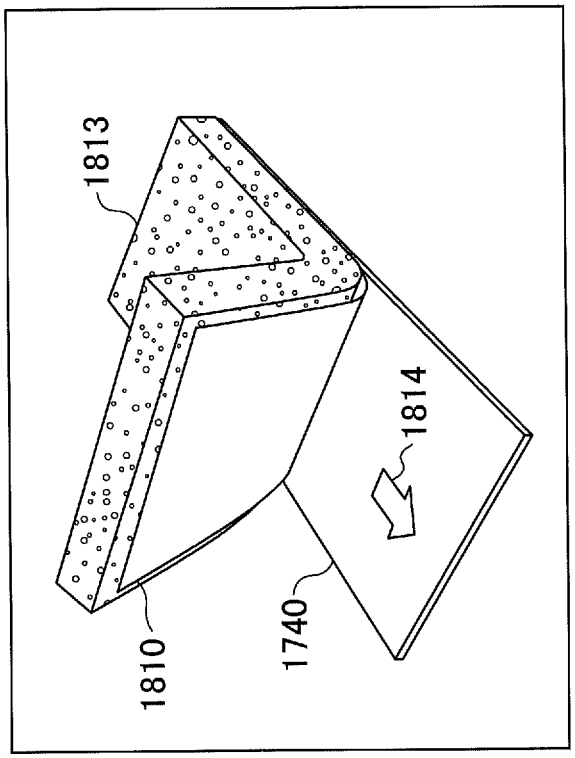

FIGS. 18A and 18B are drawings for explaining the output apparatus according to the third embodiment. The at least one plate-shaped member (hereinafter referred to as a "fin") 1810 is formed of a material (for example, iron or a material containing iron) that can be attached to the vibration plate 1730 of the flat speaker 1740 by magnetic force of the flat magnet 1710.

Also, as illustrated in FIG. 18A, the fin 1810 is attached to the vibration plate 1730 of the flat speaker 1740 by magnetic force of the flat magnet 1710, and has a first flat surface 1811 that forms a predetermined angle D with the vibration plate 1730 of the flat speaker 1740.

The flat speaker 1740 outputs sound waves by causing the vibration plate 1730 to vibrate based on sound wave signals applied to terminals 1732a and 1732b that are connected to the flat coil 1731, as illustrated in FIG. 17C.

Also, the fin 1810 functions as a second vibration plate that is configured to vibrate along with the vibration plate 1730 and output the same sound wave as the flat speaker 1740 when the flat speaker 1740 outputs a sound wave.

In order to function as the second vibration plate, the fin 1810 is formed of a metal material having a thickness of approximately 200 μm; however, the prevent invention is not limited thereto. The fin 1810 may be formed of a material other than the metal material.

Also, the fin 1810 has a second flat surface 1812 on the opposite side of the first flat surface. As illustrated in FIG. 18B, the output apparatus 110 includes a sound absorber 1813 on the second flat surface 1812 side of the fin 1810. With the sound absorber 1813, the fin 1810 functioning as the second vibration plate is configured to output sound waves in the direction of the first flat surface 1811. The sound absorber 1813 may be formed of any material having excellent sound absorbency, such as urethane foam or glass wool, for example.

Accordingly, as illustrated in FIG. 18B, by attaching the fin 1810 to the flat speaker 1740, sound waves can be output in a direction indicated by an arrow 1814.

Figure 19:
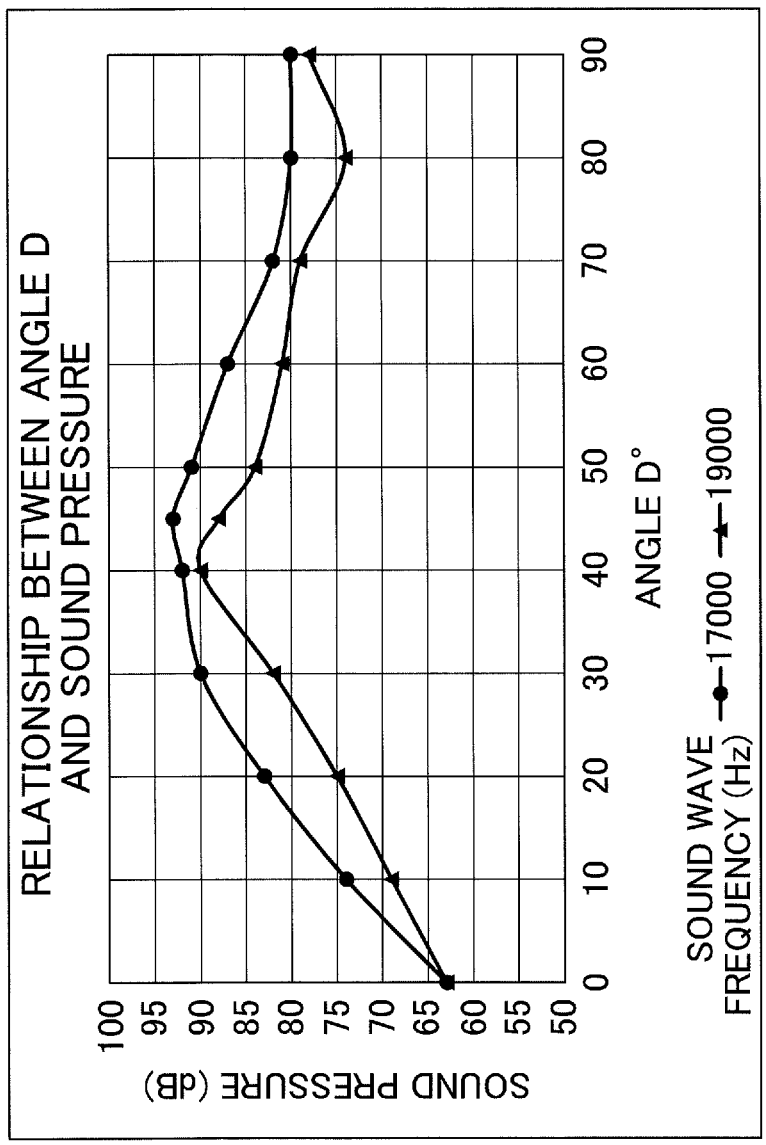
FIG. 19 is a graph for explaining the output apparatus according to the third embodiment.

FIG. 19 is a graph for explaining the output apparatus according to the third embodiment. The graph illustrated in FIG. 19 indicates an exemplary relationship between the angle D, which is formed between the flat speaker 1740 and the first flat surface 1811 of the fin 1810 illustrated in FIG. 18A, and sound pressure measured by a microphone placed in the direction indicated by the arrow 1814.

For example, as can be seen from FIG. 19, relatively high sound pressure can be obtained when the angle D is 30° to 50° in respective cases where a frequency of, a sound wave is set to 17,000 Hz and is set to 19,000 Hz. Further, the angle D is preferably 35° to 45°.

Figure 20:
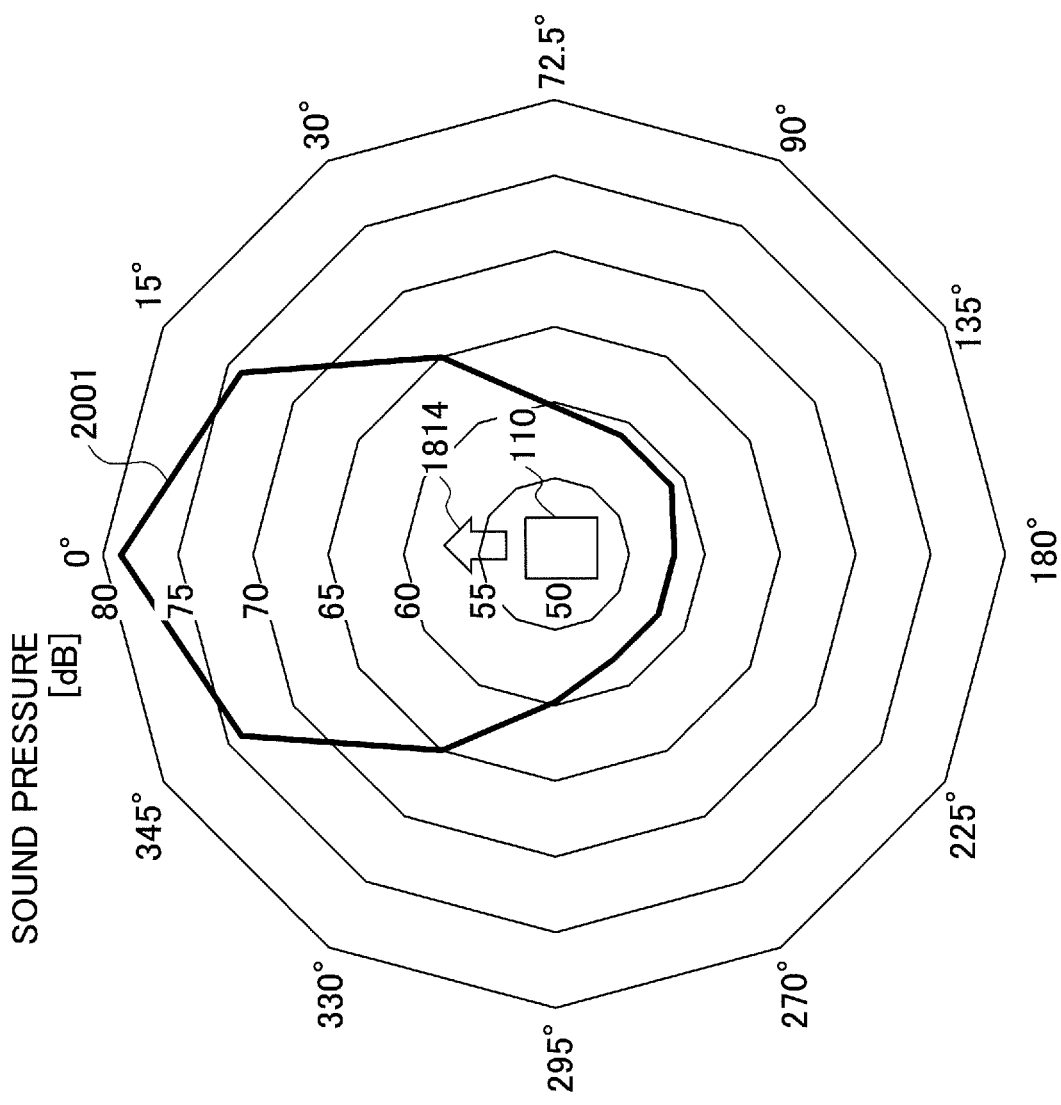
FIG. 20 is a drawing illustrating an example of directivity characteristics of the output apparatus according to the third embodiment.

FIG. 20 is a drawing illustrating an example of directivity characteristics of the output apparatus according to the third embodiment. The example illustrated in FIG. 20 indicates directivity characteristics in the horizontal direction of the output apparatus 110 including the flat speaker 1740, the fin 1810, and the sound absorber 1813 as illustrated in FIG. 18B. An arrow 1814 illustrated in FIG. 20 corresponds to the arrow 1814 illustrated in FIG. 18B.

By attaching the fin 1810 the flat speaker 1740 and also attaching the sound absorber 1813 to the fin, the output apparatus 110 can form an approximately elliptical area of sound waves. By using the above-described output apparatus 110, for example, the approximately elliptical area 102a of sound waves can be formed by the output apparatus 110a illustrated in FIG. 15.

Further, by attaching a plurality of fins 1810 to the flat speaker 1740, the output apparatus 110 can output sound waves in a plurality of directions.

Figure 21:
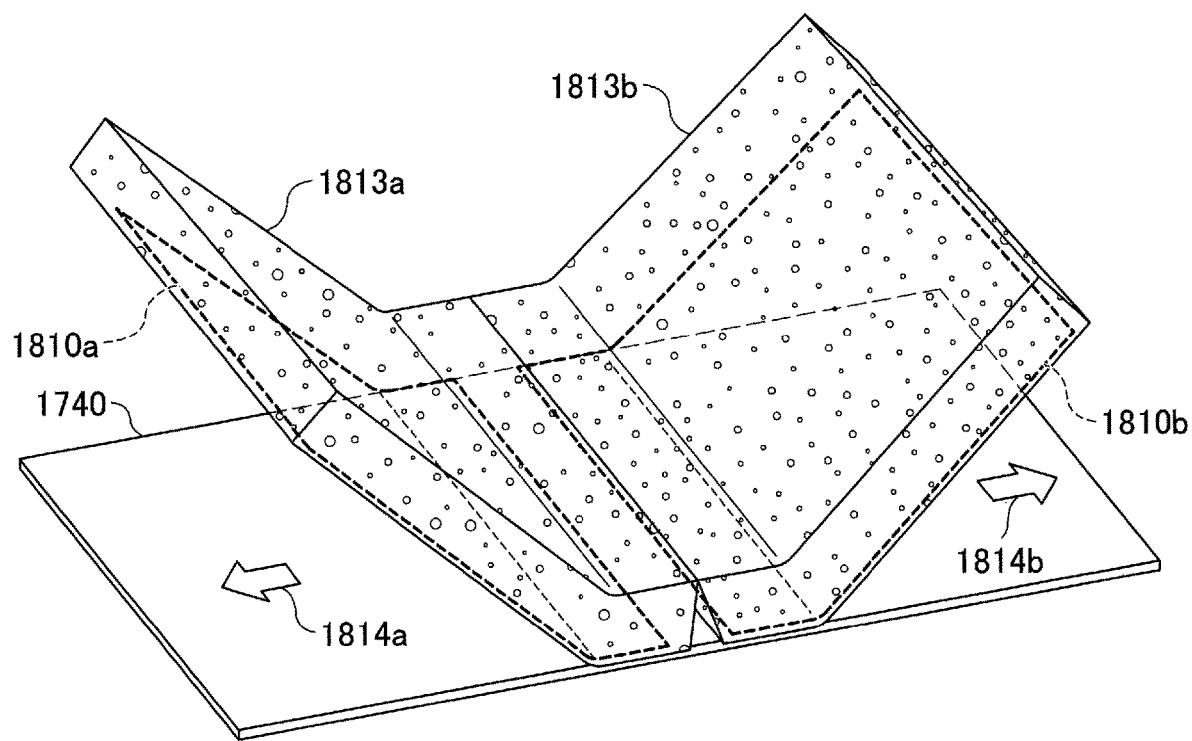
FIG. 21 is a drawing for explaining the output apparatus according to the third embodiment.

FIG. 21 is a drawing for explaining the output apparatus according to the third embodiment. FIG. 21 illustrates an example in which two fins 1810a and 1810b are attached to the flat speaker 1740.

In the example of FIG. 21, the flat speaker 1740, the fin 1810a, and a sound absorber 1813a cause sound waves to be output in a direction indicated by an arrow 1814a, and the flat speaker 1740, the fin 1810b, and the sound absorber 1813b cause sound waves to be output in a direction indicated by an arrow 1814b.

Figure 22:
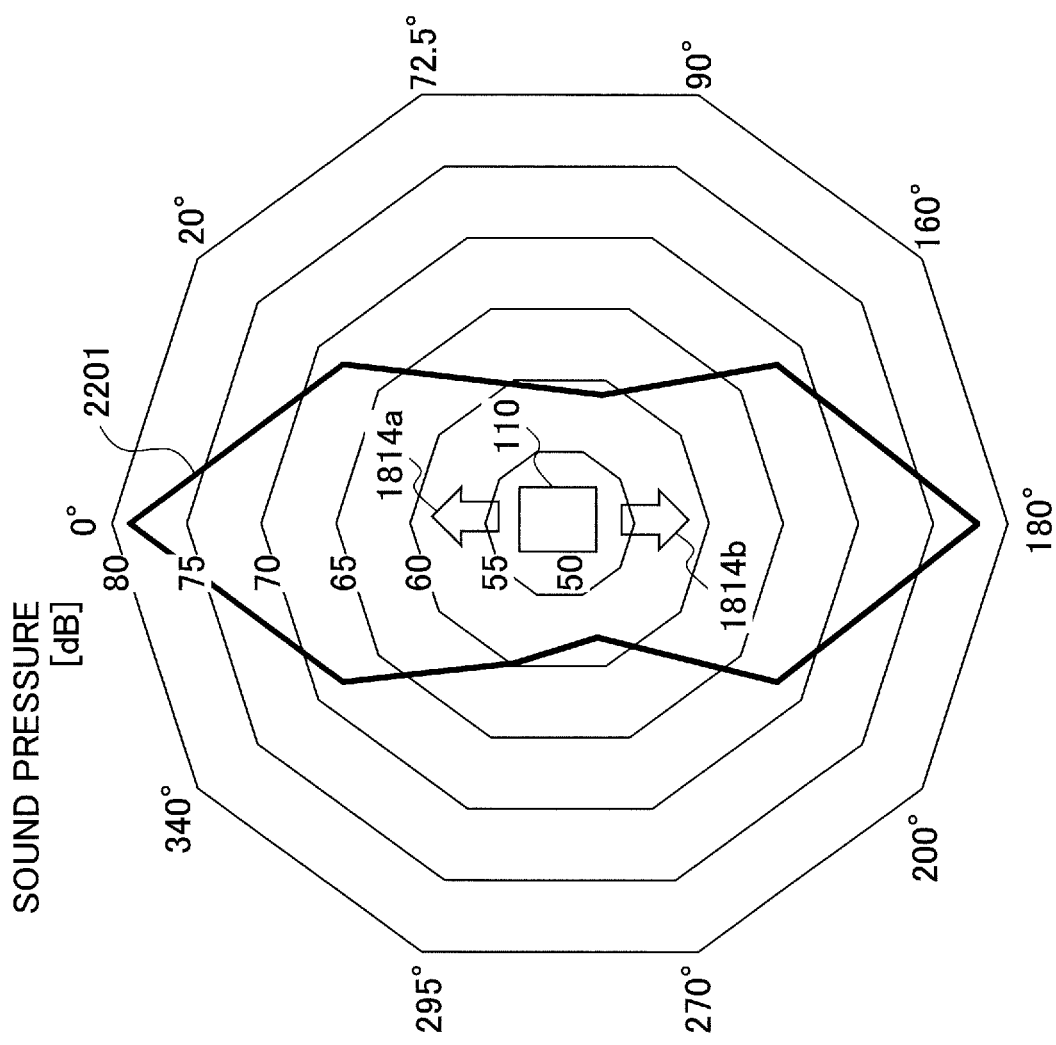
FIG. 22 is a drawing illustrating directivity characteristics of the output apparatus according to the third embodiment.

FIG. 22 is a drawing illustrating directivity characteristics of the output apparatus according to the third embodiment. The example illustrated in FIG. 22 indicates directivity characteristics in the horizontal direction of the output apparatus 110 including the flat speaker 1740, the fins 1810a and 1810b, and the sound absorbers 1813a and 1813b as illustrated in FIG. 21. An arrow 1814a and an arrow 1814b illustrated in FIG. 22 correspond to the arrow 1814a and the arrow 1814b illustrated in FIG. 21, respectively.

By attaching the fins 1810a and 1810b to the flat speaker 1740 and also attaching the sound absorbers 1813a and 1813b to the fins 1810a and 1810b, the output apparatus 110 can form approximately elliptical areas of sound waves in the two directions indicated by the arrows 1814a and 1814b. Note that the sound absorber 1813 is not necessarily divided into the two sound absorbers 1813a and 1813b, and may be one sound absorber.

Similarly, by attaching a plurality of fins 1810 to the flat speaker 1740 and also attaching plurality of sound absorbers 1813 to the fins 1810, areas of sound waves can be formed in a plurality of directions.

FIGS. 23A and 23B are drawings for explaining the output apparatus according to the third embodiment. For example, as illustrated in FIG. 23A, by attaching four fins 1810a through 1810d to the flat speaker 1740 and also attaching sound absorbers 1813 to the respective fins, the output apparatus 110 can form areas of sound waves in four directions.

Similarly, for example, as illustrated in FIG. 23B, by attaching three fins 1810a through 1810c to the flat speaker 1740 and also attaching sound absorbers 1813 to the respective fins, the output apparatus 110 can form areas of sound waves in three directions. By using the configuration illustrated in FIG. 23B, the output apparatus 110c illustrated in FIG. 15 can form the areas 102c-1 through 102c-3 in three directions.

As described, the output apparatus 110 according to the present embodiment includes the flat speaker 1740. The flat speaker 1740 can change the direction of a sound wave output from the output apparatus 110 in accordance with the direction in which the fin 1810 is attached to the vibration plate 1730 of the flat speaker 1740;

Although the example in which the fin 1810 is attached to the flat speaker 1740 by magnetic force of the flat magnet 1710 has been described above, the fin 1810 may be formed of a material that is unable to be attached by magnetic force. In this case, the fin 1810 may be attached to the vibration plate 1730 of the flat speaker 1740 with a double-sided adhesive tape or an adhesive.

According to the present embodiment, as illustrated in FIG. 15, an area of sound waves can be readily formed not only in the indoor facility 10, but also in an outdoor facility.

Further, the present invention is not limited to these embodiments, but various variations and modifications may be made without departing from the scope of the present invention.

What is claimed is:

1. A terminal apparatus for providing a description about one or more objects arranged in a predetermined area, the terminal apparatus comprising:
a memory configured to store arrangement information indicating arrangement of the one or more objects in the predetermined area and description information associated with the one or more objects; and
a processor coupled to the memory and configured to
obtain area identification information for identifying the predetermined area when the terminal apparatus is located in the predetermined area,
identify a positional relationship between the terminal apparatus and the one or more objects based on the arrangement information when the area identification information is obtained, and
cause the terminal apparatus to describe an object of the one or more objects, in accordance with the identified positional relationship between the terminal apparatus and the one or more objects, wherein the terminal apparatus further comprises:
an orientation sensor that is configured to detect a direction in which the terminal apparatus faces,
wherein the processor is configured to
receive a sound wave output from an output apparatus when the terminal apparatus is located in the predetermined area, the sound wave including the area identification information, and
obtain the area identification information included in the sound wave, and
wherein the output apparatus includes:
a flat speaker configured to output the sound wave; and
at least one plate-shaped member configured to be attached to a first vibration plate that is a vibration plate of the flat speaker and to have a first flat surface that forms a predetermined angle with the first vibration plate,
wherein the flat speaker outputs the sound wave by causing the first vibration plate to vibrate based on a sound wave signal, and
the at least one plate-shaped member functions as a second vibration plate that vibrates along with the first vibration plate and outputs the sound wave when the flat speaker outputs the sound wave.

2. The terminal apparatus according to claim 1, wherein the processor is configured to identify the object located in a predetermined direction that is detected by the orientation sensor, and
cause the terminal apparatus to describe the object located in the predetermined direction with respect to the terminal apparatus.

3. The terminal apparatus according to claim 1, wherein the terminal apparatus is a robot terminal, and the processor is configured to cause the terminal apparatus to describe the object located in a direction to which a face of the robot terminal is directed.

4. The terminal apparatus according to claim 3, wherein the processor is configured to receive predetermined control information, and cause the robot terminal to perform a predetermined action in accordance with the received predetermined control information.

5. The terminal apparatus according to claim 1, wherein the one or more objects is each configured to receive predetermined control information and to perform a predetermined action in accordance with the received predetermined control information, and
the terminal apparatus is configured to output a sound wave including the predetermined control information in accordance with the obtained area identification information.

6. The terminal apparatus according to claim 1, wherein the processor is configured to
obtain additional information on the object described by the terminal apparatus, and
cause the terminal apparatus to describe the additional information on the object when the additional information is obtained.

7. The terminal apparatus according to claim 1, wherein the processor is configured to
manage history information that includes information of a user who uses the terminal apparatus and includes information of the one or more objects already described to the user, and
prohibit the terminal apparatus from describing the one or more objects already described to the user based on the history information.

8. The terminal apparatus according to claim 7, wherein the processor is configured to permit the terminal apparatus to describe the updated or changed one or more objects when the one or more objects stored in the history information is updated or changed.

9. An output apparatus for outputting a sound wave including area identification information for identifying a predetermined area, the output apparatus comprising:
a flat speaker configured to output the sound wave, and
at least one plate-shaped member configured to be attached to a first vibration plate that is a vibration plate of the flat speaker and to have a first flat surface that forms a predetermined angle with the first vibration plate, wherein the flat speaker outputs the sound wave by causing the first vibration plate to vibrate based on a sound wave signal, and the at least one plate-shaped member functions as a second vibration plate that vibrates along with the first vibration plate and outputs the sound wave when the flat speaker outputs the sound wave, wherein the at least one plate-shaped member has a second flat surface on an opposite side of the first flat surface, and the output apparatus includes a sound absorber disposed on the second flat surface of the at least one plate-shaped member to absorb the sound wave.

10. The output apparatus according to claim 9, wherein the at least one plate-shaped member is configured to change a direction of the sound wave output from the output apparatus, in accordance with a direction in which the at least one plate-shaped member is attached to the first vibration plate.

11. An output apparatus for outputting a sound wave including area identification information for identifying a predetermined area, the output apparatus comprising:
 a flat speaker configured to output the sound wave, and
 at least one plate-shaped member configured to be attached to a first vibration plate that is a vibration plate of the flat speaker and to have a first flat surface that forms a predetermined angle with the first vibration plate, wherein the flat speaker outputs the sound wave by causing the first vibration plate to vibrate based on a sound wave signal, and the at least one plate-shaped member functions as a second vibration plate that vibrates along with the first vibration plate and outputs the sound wave when the flat speaker outputs the sound wave, wherein the flat speaker includes: a magnet layer including one or more permanent magnets; and the first vibration plate being coupled to the magnet layer via a buffer member and having a flat coil, and the at least one plate-shaped member is attached to the first vibration plate by magnetic force of the magnet layer.

12. An information processing system including a terminal apparatus for providing a description about one or more objects arranged in a predetermined area, the information processing system comprising:
 a memory configured to store arrangement information indicating arrangement of the one or more objects in the predetermined area and description information associated with the one or more objects; and
 a processor coupled to the memory and configured to
 obtain area identification information for identifying the predetermined area when the terminal apparatus is located in the predetermined area,
 identify a positional relationship between the terminal apparatus and the one or more objects based on the arrangement information when the area identification information is obtained, and
 cause the terminal apparatus to describe an object of the one or more objects, in accordance with the identified positional relationship between the terminal apparatus and the one or more objects, wherein the information processing system further comprises:
 an orientation sensor that is configured to detect a direction in which the terminal apparatus faces, wherein the processor is configured to
 receive a sound wave output from an output apparatus when the terminal apparatus is located in the predetermined area, the sound wave including the area identification information, and
 obtain the area identification information included in the sound wave, and
 wherein the output apparatus includes:
 a flat speaker configured to output the sound wave; and
 at least one plate-shaped member configured to be attached to a first vibration plate that is a vibration plate of the flat speaker and to have a first flat surface that forms a predetermined angle with the first vibration plate,
 wherein the flat speaker outputs the sound wave by causing the first vibration plate to vibrate based on a sound wave signal, and
 the at least one plate-shaped member functions as a second vibration plate that vibrates along with the first vibration plate and outputs the sound wave when the flat speaker outputs the sound wave.

* * * * *